United States Patent
Hamidinejad et al.

(10) Patent No.: US 11,603,448 B2
(45) Date of Patent: *Mar. 14, 2023

(54) METHODS OF EXFOLIATING AND DISPERSING A GRAPHITIC MATERIAL INTO POLYMER MATRICES USING SUPERCRITICAL FLUIDS

(71) Applicant: NanoXplore Inc., Montreal (CA)

(72) Inventors: Seyed Mahdi Hamidinejad, Toronto (CA); Chul B. Park, Etobicoke (CA); Soroush Nazarpour, Saint Therese (CA)

(73) Assignee: NanoXplore Inc., Montreal (CA)

( * ) Notice: Subject to any disclaimer, the term of this patent is extended or adjusted under 35 U.S.C. 154(b) by 188 days.

This patent is subject to a terminal disclaimer.

(21) Appl. No.: 16/986,382

(22) Filed: Aug. 6, 2020

(65) Prior Publication Data

US 2021/0139667 A1    May 13, 2021

Related U.S. Application Data

(63) Continuation of application No. 16/700,205, filed on Dec. 2, 2019, now Pat. No. 10,774,195, which is a continuation of application No. PCT/CA2018/050648, filed on May 31, 2018.

(60) Provisional application No. 62/512,790, filed on May 31, 2017.

(51) Int. Cl.
| | | |
|---|---|---|
| *C08K 3/04* | (2006.01) |
| *B29C 48/00* | (2019.01) |
| *B29C 48/40* | (2019.01) |
| *B29B 9/10* | (2006.01) |
| *B29C 43/00* | (2006.01) |
| *B29C 45/00* | (2006.01) |
| *C08L 57/00* | (2006.01) |

(52) U.S. Cl.
CPC .............. *C08K 3/042* (2017.05); *B29B 9/10* (2013.01); *B29C 43/003* (2013.01); *B29C 43/006* (2013.01); *B29C 45/0001* (2013.01); *B29C 48/022* (2019.02); *B29C 48/40* (2019.02); *C08L 57/00* (2013.01); *B29C 2045/0091* (2013.01); *C08L 2310/00* (2013.01)

(58) Field of Classification Search
CPC ....... C08K 3/042; C08L 57/00; B29C 48/022; B29C 48/40; B29C 43/003; B29C 43/006
See application file for complete search history.

(56) References Cited

U.S. PATENT DOCUMENTS

| 10,774,195 B2 | 9/2020 | Hamidinejad et al. |
| 2005/0131126 A1 | 6/2005 | Yang et al. |
| 2014/0271970 A1 | 9/2014 | Crawford et al. |

FOREIGN PATENT DOCUMENTS

| CA | 2 595 445 A1 | 2/2008 |
| CN | 101219573 A | 7/2008 |
| CN | 201195384 Y | 2/2009 |
| CN | 102718983 A | 10/2012 |
| CN | 105623098 A | 6/2016 |
| CN | 106046369 A | 10/2016 |
| JP | 2005118984 A | 5/2005 |
| JP | 2012-131962 A | 7/2012 |
| JP | 2013072037 A | 4/2013 |
| JP | 2015-000841 A | 1/2015 |
| JP | 2018520917 A | 8/2018 |
| KR | 10-2012-0128736 A | 11/2012 |
| WO | WO 2016/090481 A1 | 6/2016 |
| WO | WO 2017/117683 A1 | 7/2017 |

OTHER PUBLICATIONS

Non-Final Office Action dated Feb. 21, 2020 for U.S. Appl. No. 16/700,205, 6 pages.
Office Action for Chinese Application No. 201880043899.1, dated Jan. 28, 2022, 23 pages.
International Search Report and Written Opinion dated Aug. 7, 2018 for International Application No. PCT/CA2018/050648, 8 pages.
Extended European Search Report dated Jan. 20, 2021 for European Application No. 18810007.7, 10 pages.
Calizo, I. et al., "Spectroscopic Raman Nanometrology of Graphene and Graphene Multilayers on Arbitrary Substrates," J. Phys.: Conf. Ser., 109:012008 (2008), 5 pages; doi:10.1088/1742-6596/109/1/012008.
Ellingham, T. et al., "Sub-critical gas-assisted processing using $CO_2$ foaming to enhance the exfoliation of graphene in polypropylene + graphene nanocomposites," Polymer, 117, 132-139 (2017).

(Continued)

*Primary Examiner* — Edward J Cain
(74) *Attorney, Agent, or Firm* — Cooley LLP

(57) ABSTRACT

Embodiments described herein relate generally to systems and methods for manufacturing a master batch with a graphitic material dispersed in a polymer matrix. In some embodiments, a method for manufacturing the master batch can include combining the graphitic material with a polymer, adding a supercritical fluid to the mixture, and depressurizing the supercritical fluid to remove the supercritical fluid. In some embodiments, the method includes mixing the graphitic material and the polymer for a first time period to form a first mixture and transferring the supercritical fluid to the first mixture to form a second mixture. In some embodiments, the method includes mixing the second mixture for a second time period and depressurizing the second mixture to allow the supercritical fluid to transition to a gas phase.

24 Claims, 6 Drawing Sheets

(56) References Cited

OTHER PUBLICATIONS

Ellingham, T. K. et al., "Enhanced graphene dispersion in polypropylene nanocomposites processed with supercritical fluid," Conference ANTEC, Orlando, FL, Jan. 2015, 1 page.
Ferrari, A. C. et al., "Raman Spectrum of Graphene and Graphene Layers," PRL 97:187401 (2006), 4 pages; http://dx.doi.org/10.1103/PhysRevLett.97.187401.
Gedler, G. et al., "Enhanced electromagnetic interference shielding effectiveness of polycarbonate/graphene nanocomposites foamed via 1-step supercritical carbon dioxide process," Materials and Design, 90:906-914 (2016).
Kuang, T.-R. et al., "Fabrication of Poly(lactic acid)/Graphene Oxide Foams with Highly Oriented and Elongated Cell Structure via Unidirectional Foaming Using Supercritical Carbon Dioxide," Ind. Eng. Chem. Res., 54:758-768 (2015).
Sasikala, S. P. et al., "Prospects of Supercritical Fluids in Realizing Graphene-Based Functional Materials," Adv. Mater., 28:2663-2691 (2016).
Wang, H. et al., "Vibrational properties of graphene and graphene layers," J. Raman Spectrosc.,40:1791-1796 (2009).
Yang, G. et al., "Fabrication of well-controlled porous foams of graphene oxide modified poly(propylene-carbonate) using supercritical carbon dioxide and its potential tissue engineering applications," J. of Supercritical Fluids, 73:1-9 (2013).
Zhou, H. et al., "Layer-dependent morphologies and charge transfer of Pd on n-layer graphenes," Chem. Commun., 47:9408-9410 (2011).
Japanese Office Action for Application No. JP20190566361 dated May 27, 2022, 13 pages.

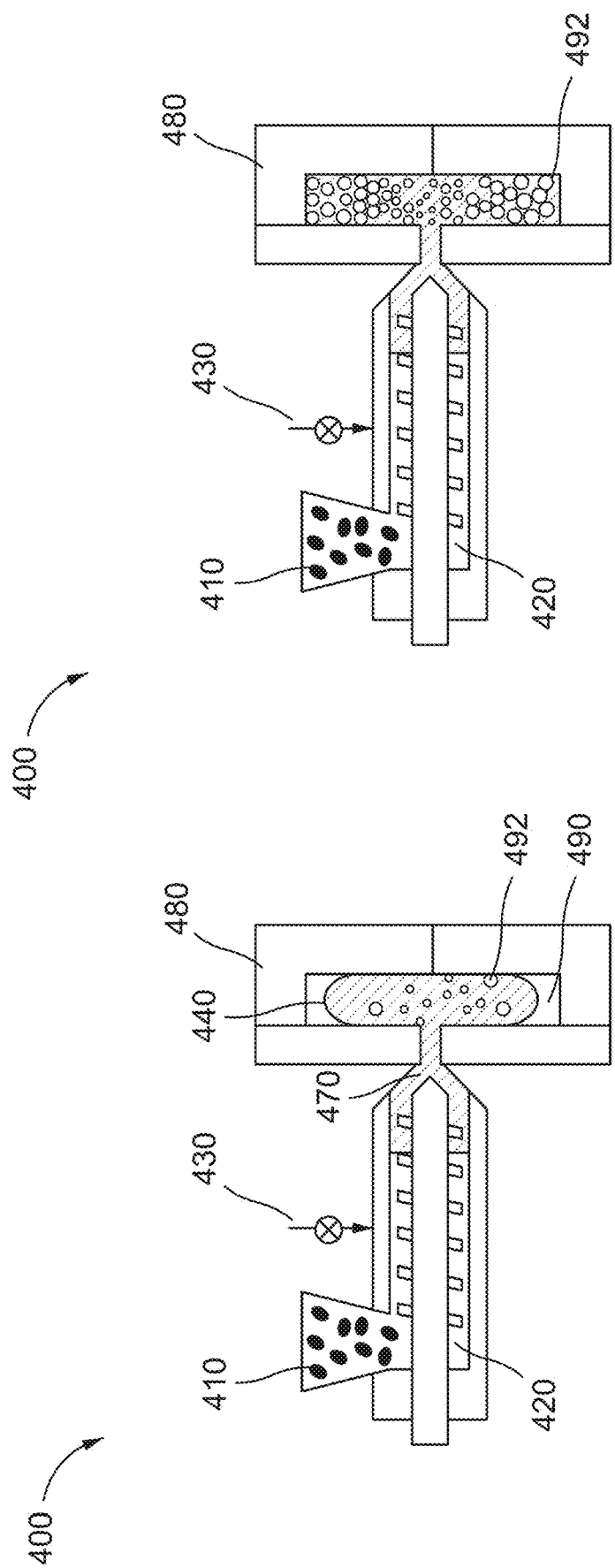

METHODS OF EXFOLIATING AND DISPERSING A GRAPHITIC MATERIAL INTO POLYMER MATRICES USING SUPERCRITICAL FLUIDS

CROSS-REFERENCE TO RELATED APPLICATIONS

This application is a continuation of U.S. patent application Ser. No. 16/700,205, filed Dec. 2, 2019 and titled "Methods of Exfoliating and Dispersing a Graphitic Material into Polymer Matrices Using Supercritical Fluids," which is a continuation of International Patent Application No. PCT/CA2018/050648, filed May 31, 2018 and titled "Methods of Exfoliating and Dispersing a Graphitic Material into Polymer Matrices Using Supercritical Fluids," which claims priority to and the benefit of U.S. Provisional Patent Application Ser. No. 62/512,790, filed May 31, 2017 and titled "Method of Exfoliating and Dispersing High Concentration Graphene Nanoplatelets (GNP) into Polymeric Matrices using Supercritical Fluid (SCF)," the disclosures of which are hereby incorporated by reference in their entirety.

BACKGROUND

Graphene is a single, one atomic layer of carbon atoms with several exceptional electrical, mechanical, optical, and electrochemical properties, earning it the nickname "the wonder material." To name just a few, it is highly transparent, extremely light and flexible yet robust (high mechanical strength), and an excellent electrical and thermal conductor. In addition, its unique 2D hexagonal lattice structure with atomic-scale thickness and high aspect ratios further differentiates graphene from other types of materials. Such extraordinary properties render graphene and related thinned graphite materials as promising candidates for a diverse set of applications ranging from energy efficient airplanes to extendable electronic papers. For example, graphene based batteries may allow electric cars to drive longer and smart phones to charge faster. Other examples include graphene's ability to filter salt, heavy metals, and oil from water, efficiently convert solar energy, and when used as coatings, prevent steel and aluminum from rusting. In the longer term, thinned crystalline graphite in general promises to give rise to new computational paradigms and revolutionary medical applications, including artificial retinas and brain electrodes.

Although single layer graphene has shown all the desirable properties, making use of these properties remains challenging and requires a very good dispersion of graphene into specific material systems, for example, polymers. Due to the strong van der Waals interaction between layers of graphene, graphene nanoflakes, particularly those having low-defect basal structures, tend to aggregate to give larger particles. Such aggregation significantly lowers the achievable interface interaction between graphene and the polymer matrices, and thus limits to a great extent the achievable properties of graphene/polymer composites.

SUMMARY

Embodiments described herein relate generally to systems and methods for manufacturing a master batch with a graphitic material dispersed in a polymer matrix. In some embodiments, a method for manufacturing the master batch can include combining the graphitic material with a polymer, adding a supercritical fluid to the mixture, and depressurizing the supercritical fluid to remove the supercritical fluid. In some embodiments, the method includes mixing the graphitic material and the polymer for a first time period to form a first mixture and transferring the supercritical fluid to the first mixture to form a second mixture. In some embodiments, the method includes mixing the second mixture for a second time period and depressurizing the second mixture to allow the supercritical fluid to transition to a gas phase. In some embodiments, the graphitic material has a first average thickness prior to the first time period and second average thickness less than the first thickness after the first time period. In some embodiments, the graphitic material has a third average thickness less than the second average thickness after the second time period. In some embodiments, the graphitic material has a fourth average thickness less than the third average thickness after depressurizing the second mixture.

BRIEF DESCRIPTION OF THE DRAWINGS

FIG. 4 is a schematic illustration of a system for manufacturing a master batch with graphene dispersed in a polymer matrix, according to an embodiment.

FIG. 5 is a schematic illustration of a system for manufacturing a master batch with graphene dispersed in a polymer matrix, according to an embodiment.

DETAILED DESCRIPTION

Figure 1:
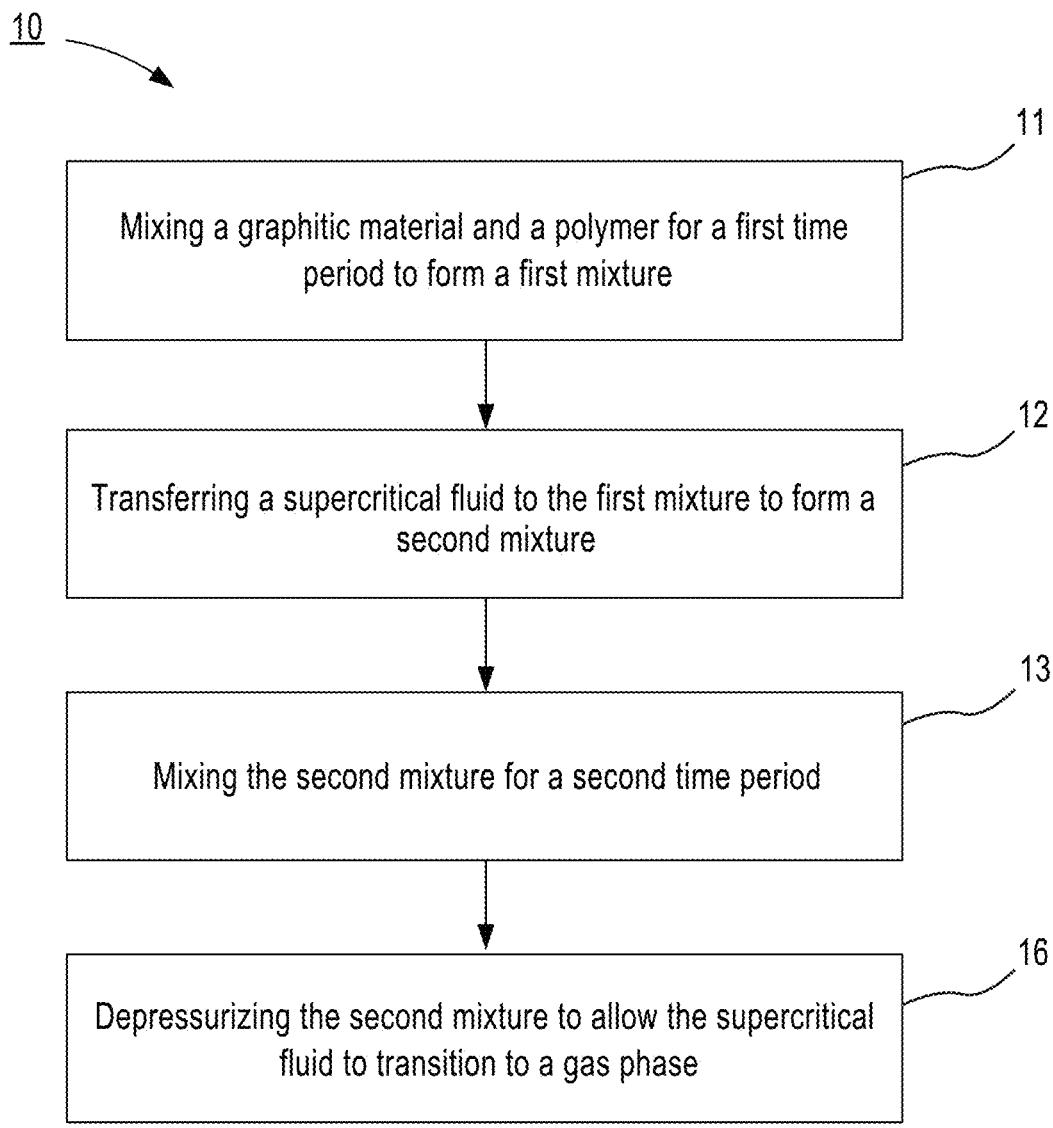
FIG. 1 is a flow diagram illustrating a method manufacturing a master batch with graphene dispersed in a polymer matrix, according to an embodiment.

Next-generation, multifunctional materials are considered to be the foundation for technological innovations in the $21^{st}$ century. By combining science with specialized engineering knowledge, research on advanced functional materials will enable the design and development of cutting-edge, multifunctional, lightweight, and high-performance materials for a wide variety of applications that can be used in the automotive, aerospace, telecommunication, energy, and microelectronics industries. Over the last decades, conductive polymer composites have shown enormous potential as a highly desirable class of advanced functional materials. They have an attractive array of properties. Compared with metallic and ceramic composites, polymer composites have an attractive array of properties including ease of processing, superior resistance to chemicals and corrosion, and tailorable physical/mechanical properties. Tunable functionality of the polymer composites achieved by the incorporation of different fillers can help to address the requirements of a broad range of cutting-edge applications.

With the recent advances in nanomaterials and their growing availability, the types and functions available for polymer composites has been significantly developed. This has brought promising opportunities for development of polymer composites (e.g., graphene nanoplatelet-containing polymer nanocomposites) with superior properties for various application. One example of the filler candidates now emerging is graphene. Graphene is an atomically thick layer composed of sp2 carbon atoms that have formed a 2-D, honeycomb-structured lattice. In recent years, graphene has attracted great attention due to its exceptional mechanical, electrical, and thermal properties. Notably, it is the strongest material ever measured with an ultimate strength of 130 GPa and Young's modulus of 1 TPa. The thermal and electrical conductivities of single-layer graphene have been respectively reported ~5000 W/(m·K) and ~6000 S/cm$^2$.

However, the underpinning for economically viable manufacturing of graphene-based polymer composites is missing. It is greatly challenging and expensive to exploit the full potential of graphene due to the complexities in the exfoliation and dispersion of graphene layers in the polymer matrix.

There are several approaches to produce and exfoliate graphitic material (e.g., graphene nanoplatelets): (i) Formation of graphene oxide platelets followed by reduction. In this approach, the natural graphite materials are treated with intercalant and an oxidant to produce graphite intercalated compound, also called graphite oxide. The resulting product will be then subjected to exfoliation procedure which can be either solution-based separation approach assisted by sonication or thermal shock exposure. (ii) Formation of pristine graphene nanoplatelets directly from natural graphite without going through a chemical intercalation route such as direct sonication of graphite flakes to separate and exfoliate graphene nanoplatelets which is very challenging. (iii) Small scale production of graphene nanoplatelets using chemical vapor deposition and epitaxial growth. (iv) The synthesis of graphene nanoplatelets from molecules which is called bottom-up method.

In the most of above-mentioned graphite intercalation and exfoliation methods, considerable amount of chemicals are required which leads to tedious washing steps. The graphene oxide, prepared in approach (i), even after chemical and thermal reductions still shows much lower thermal and electrical conductivities as compared to the pristine graphene nanoplatelets, due to the complexities in complete reduction of highly oxidized graphite in this method. The graphene nanoplatelets produced through the (iii) and (iv) approaches can be highly conducting and defect-free, however, these approaches are cost prohibitive for large-scale production of graphene nanoplatelets.

Thus, there is a long-felt need in the industry for a process of exfoliating graphitic materials and dispersing the graphitic materials in a polymer matrix in an efficient and cost-effective process.

As used herein, the term "thinned graphite" refers to crystalline graphite that has had its thickness reduced to a thickness from about 300 layers to about 1,200 layers, which is roughly equivalent to between about 100 nm and about 400 nm. As used herein, the term "few-layer graphene" refers to crystalline graphite that has a thickness from about 1 graphene layer to about 10 graphene layers. As used herein, "graphitic material," "graphene flakes," "graphene nanoflakes," "graphene sheets," and "graphene nanoplatelets" all refer to any structured material comprised of graphene layers.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about", "substantially", and "approximately" generally mean plus or minus 10% of the value stated, e.g., about 250 μm would include 225 μm to 275 μm, about 1,000 μm would include 900 μm to 1,100 μm.

Graphene's exceptional properties (e.g., mechanical, thermal, electrical, etc.) coupled with the high surface energy (e.g., about 40 mJ/m$^2$ to about 60 mJ/m$^2$) and very high surface area (e.g., about 2630 m$^2$/g), suggest graphene can serve as a very effective additive in improving materials' mechanical, electrical, and thermal properties, even at very low loading levels (i.e., additive concentration), for example, less than about 2 wt %. In some embodiments, one may desire to produce graphene sheets (e.g., exfoliate thick graphene nanoflakes), de-agglomerate stacked graphene sheets, and/or prevent restacking of the de-agglomerated/exfoliated graphene nanoflakes prior to or during the use of graphitic materials in the noted applications.

In some embodiments, large scale production methods such as the reduction of graphene oxide obtained from oxidation of graphite, the thermal exfoliation of expanded graphite, the chemo-mechanical exfoliation of graphite, or chemical vapor deposition of graphitic materials may be used in producing graphene sheets. In some embodiments, depending on the production method employed, the resulting graphene products may comprise a graphitic material having different number of graphene layers, such as single layer graphene, few layer graphene, and graphene nanoplatelets. However, graphene sheets produced from the above-noted techniques may have different drawbacks. For example, although graphene nanoflakes produced from the reduction of graphene oxide can comprise mainly single layer graphene, the nanoflakes may have poor crystalline quality and contain high density of in-plane defects. Furthermore, although graphene oxide can display a favorable dispersion behavior in various matrices, graphene-containing products produced from the reduction of graphene oxide can be difficult to disperse or to manage due to graphene aggregation. As another example, although the thermal exfoliation method can be suitable for large-scale production of graphene sheets, there can be difficulties in controlling the sheet sizes as well as the defect contents of the resulting graphene nanoflakes. The chemical vapor deposition method can yield high quality graphene, but may not be best suited for large-scale production. In comparison, chemo-mechanical exfoliation of graphite, discussed in PCT International Patent Application No. PCT/CA2015/051292, the entire contents of which are incorporated herein by reference in its entirety, can allow the production of low-defect graphene sheets with controllable functionalities.

Some previous methods for dispersing graphitic material in a polymer matrix are discussed in PCT International Patent Publication No. WO/2017/117683 (hereafter "the '683 Publication"), filed Jan. 6, 2017, entitled "Methods of Compounding Graphene with Non-Conductive Particles and Applications Thereof" the entire contents of which are incorporated herein by reference in its entirety. These previous methods may achieve some extent of dispersion of the graphitic material in a polymer, however the graphitic material typically doesn't become further exfoliated during or after admixing the graphitic material with the polymer.

Physical and mechanical properties of graphene-containing polymer composites not only depend on the chemical composition, defects concentration, aspect ratio and level of exfoliation of graphene nanoplatelets; but also, highly depend on how well the graphene nanoplatelets are dispersed in a polymer matrix. One of the most economically viable and scalable technique for dispersing graphene nanoplatelets into thermoplastic polymers is melt mixing due to more compatibility with current industrial practice. However, knowledge about melt mixing of graphene-containing polymer composites (e.g., graphene nanoplatelet-based polymer nanocomposites) is still insufficient. Restacking and agglomeration of graphene nanoplatelets during melt blending can significantly reduce their effectiveness in the functionality enhancement of the products. Thus, it is desirable to develop an economically viable and scalable method of melt blending not only to assure that the exfoliated graphene nanoplatelets remain exfoliated but also to further exfoliated and dispersed them during blending.

Accordingly, the present disclosure describes a method of supercritical fluid-assisted manufacturing of a graphene-containing masterbatch with a high-level of exfoliation and dispersion in the polymer matrix. In some embodiments, the graphitic material can be blended with the polymer during melt mixing to form a treatable graphene nanoplatelet-polymer mixture. In some embodiments, the molten graphene nanoplatelet-polymer mixture can then be subjected to a supercritical fluid. Without wishing to be bound to any particular theory, it is believed that over a sufficient period of time, the supercritical fluid is capable of intercalating graphitic layered structures. Without wishing to be bound by any particular theory, the intercalation of supercritical fluid between layers of the graphitic material may weaken the bonding force of the graphitic material layers, which may make it easier to exfoliate and disperse the graphitic material. Moreover, the dissolution of supercritical fluid in the polymer melt may provide a favorable interaction between the graphene nanoplatelets surface and polymer melt, leading to system energy reductions. This may decrease surface tension between the graphitic material and the polymer matrix, resulting in better dispersion of the graphitic material. Furthermore, the plasticizing effect of supercritical fluid enhances the diffusivity of the polymer molecules. Thus, the penetration of supercritical fluid into the interlayer regions of the graphitic material can make it easier for intercalation of polymer chains into the interlayer regions after the supercritical fluid is removed. As a result, the exfoliation and layer separation of graphene nanoplatelets is further induced. It is desirable to completely maintain the single-phase of polymer/gas mixture throughout the process (e.g. twin screw extrusion) to dissolve completely the gas. If second phases are generated, then this exfoliation will become less pronounced.

The process is then followed by rapid depressurizing to change the intercalated-supercritical fluid to a gas, allowing the gas to escape. During the phase transition, the expanding supercritical fluid can further separate and exfoliate individual graphene layers. Moreover, during the phase transformation, many small cells are generated between the platelets within the intercalated polymer/gas mixture leading to further delamination and separation of individual platelets in the polymer matrix. Meanwhile, during the depressurization and phase transformation of supercritical fluid, additional driving force for delamination and dispersion of graphene nanoplatelets is generated. Without wishing to be bound by any particular theory, the growth of nucleated cells near graphene nanoplatelets, acting as nucleating agents, may further delaminate and uniformly disperse the graphene nanoplatelets in the polymer matrix.

Embodiments described herein relate generally to systems and methods for manufacturing a master batch including a graphitic material dispersed in a polymer matrix. In some embodiments, a method for manufacturing the master batch can include combining the graphitic material with a polymer, exposing the mixture to a supercritical fluid, and depressurizing the supercritical fluid to remove the supercritical fluid. In some embodiments, the mixture can be exposed to the supercritical fluid and then depressurized repeatedly.

In some embodiments, the method can include mixing a graphitic material and a polymer for a first time period to form a first mixture. In some embodiments, the method can further include transferring a supercritical fluid to the first mixture to form a second mixture. In some embodiments, the method can further include mixing the second mixture for a second time period. In some embodiments, the method can further include depressurizing the second mixture to allow the supercritical fluid to transition to a gas phase. In some embodiments, the method can further include maintaining the second mixture above a critical pressure of the supercritical fluid. In some embodiments, the method can further include maintaining the second mixture above a critical temperature of the supercritical fluid.

In some embodiments, the graphitic material can include at least one of crystalline graphite, graphene nanoplatelets, few-layer graphene, single layer graphene, graphene oxide, expanded graphite oxide, and combinations thereof. In some embodiments, the graphitic material can have a first average thickness prior to the first time period and second average thickness less than the first thickness after the first time period. In some embodiments, the graphitic material can have a third average thickness less than the second average thickness after the second time period. In some embodiments, the graphitic material can have a fourth average thickness less than the third average thickness after depressurizing the second mixture. In some embodiments, the supercritical fluid can include at least one of carbon dioxide and nitrogen. In some embodiments, the second mixture can include greater than about 10 wt % graphene.

In some embodiments, the first average thickness can be between about 10 layers and about 100 layers. In some embodiments, the second average thickness can be between about 10 layers and about 100 layers. In some embodiments, the third average thickness can be between about 5 layers and about 50 layers. In some embodiments, the fourth average thickness can be between 1 layer and about 10 layers.

In some embodiments, the supercritical fluid can be a first supercritical fluid and the method can further include transferring a second supercritical fluid to the second mixture to form a third mixture and mixing the third mixture for a third time period. In some embodiments, the first supercritical fluid can be different from the second supercritical fluid. In some embodiments, the mixture can be exposed to the supercritical fluid and then depressurized repeatedly.

Methods of Manufacturing Graphene

Embodiments described herein can use any graphitic material manufactured according to any suitable method. In some embodiments, the graphitic material can be manufactured in a large-scale synthesis process, producing charged and/or functionalized graphene sheets. In some embodiments, the manufacturing processes described herein can produce at least partially oxidized graphene sheets via a thinning and oxidation process of precursor crystalline graphite. In some embodiments, the oxidation processes disclosed herein can increase the mixability and/or dispersibility of graphitic materials in such products, and in solvents (e.g., polar, non-polar, etc.) in general. In some embodiments, methods and systems for producing electrostatically charged and hydroxylated graphene sheets from crystalline precursor graphite are disclosed.

In some embodiments, the methods can include a milling process wherein highly charged (electrostatically), hydroxylated and oxidized thinned graphitic materials are produced starting with a precursor crystalline graphite material. In some embodiments, the disclosed processes for thinning precursor crystalline graphite may reduce the lateral size of the precursor crystalline graphite. In other words, as layers of graphene sheets are removed from crystalline graphite, the in-plane sizes of the resulting thinned product may also be reduced. In some embodiments, the processes of the present disclosure can include a milling process wherein highly charged (electrostatically), hydroxylated and oxidized thinned graphitic materials are produced starting with a precursor crystalline graphite material.

In some embodiments, the methods include a process where the crystalline graphite (e.g., flake graphite powder) can be thinned to single, few or multi-layer graphene sheets with charged edges that facilitate the hydroxylation and/or carbonylation of the edges of the graphene sheets. In some embodiments, the process comprises combining large crystalline precursor graphite with electrolyte slurry into a grinding vessel or jar such as, but not limited to, an attritor or attritor ball mill. In some embodiments, the electrolyte slurry includes at least a metal hydroxide salt and an aqueous solution comprising a polar solvent (e.g., water, ethanol, 1-propanol), a weak oxidizer, and a surfactant. In some embodiments, the grinding vessel and/or the associated grinding media can be chosen based on the amount of electrostatic charge one desires to generate during the disclosed processes. In some embodiments, selection of the grinding vessel and/or the associated grinding media can be used as a control over the charging level of the thinned graphene sheets. For example, in some embodiments, vessels or jars made from insulating material such as Alumina or Zirconia accompanied with same/similar type of grinding balls generate higher electrostatic charges than stainless steel jars and balls. In some embodiments, another parameter that can be used to control the generation and amount of the electrostatic charge to be produced during the disclosed milling processes is the rotation speed. For example, in some embodiments, medium rotation speed of the grinding vessel can introduce electrostatic charges on and within the electrolyte, resulting in the ionization of the metal hydroxide salt.

In some embodiments, the hydroxide ions released into the electrolyte slurry from the metal hydroxide salt can diffuse into the interlayer spacing of the layered crystalline precursor graphite, i.e., the hydroxide ions intercalate graphite so as to cause the formation of n-stage intercalated graphite. In some embodiments, n can be any one of natural numbers less than the number of graphene layers in the crystalline precursor graphite. For example, n can be 1, 2, 3, 4, 5, etc. In some embodiments, the n-stage intercalated graphite can be a combination of different stage intercalated graphite. For example, the hydroxide ions can intercalate graphite so as to cause the formation of 1-stage and 2-stage intercalated graphite, and/or the like. In some embodiments, this may facilitate the exfoliation of layers of graphene sheets from the precursor graphite by the shearing forces induced during the rotation of the grinding vessel or jar. In some embodiments, the resulting graphene sheets tend to maintain the initial lateral size of precursor graphite while their thickness may be dramatically lowered, in particular in comparison to the thickness of the initial precursor graphite. In some embodiments, the resulting graphene-containing product (which may include thinned graphitic materials such as, but not limited to, single, few and multi-layer graphene sheets, etc.) may be post-processed (e.g., filtered, washed, dried, and/or the like) so as to at least remove extraneous by-products. In some embodiments, at the end of the milling process, the resulting graphene product may appear to be black, and may exhibit a fluffy structure. Further, the resulting product may be electrostatically highly charged and contain hydroxyl molecules, and the electrostatic charges and the hydroxyl molecules may appear more at the edges of the resulting graphene sheets than on the surface (e.g., towards the center).

In some embodiments, the process includes thinning precursor crystalline graphite in the presence of an electrolyte solution. As used herein, the term "crystalline graphite" or "precursor crystalline graphite" refers to graphite-based material of a crystalline structure with a size configured to allow milling in a grinding or milling vessel or jar. For example, the crystalline graphite can be layered graphene sheets with or without defects, such defects comprising vacancies, interstitials, line defects, etc. The crystalline graphite may come in diverse forms, such as but not limited to ordered graphite including natural crystalline graphite, pyrolytic graphite (e.g., highly ordered pyrolytic graphite (HOPG)), synthetic graphite, graphite fiber, graphite rods, graphite minerals, graphite powder, flake graphite, any graphitic material modified physically and/or chemically to be crystalline, and/or the like. In some embodiments, the crystalline graphite can be graphite oxide. The lateral or in-plane size as well as the thickness of the ordered graphite can assume a wide range of values. For example, using an appropriate measure to quantify the lateral size of the ordered graphite as discussed above (e.g., mean lateral sizes, diameter, etc., depending on the shape, for example), the lateral sheet size of the ordered graphite can range from about 1 nm to about 1,500 μm, about 2 nm to about 1,400 μm, about 3 nm to about 1,300 μm, about 4 nm to about 1,200 μm, about 5 nm to about 1,000 μm, about 6 nm to about 900 μm, about 7 nm to about 800 μm, about 8 nm to about 700 μm, about 9 nm to about 600 μm, or about 10 nm to about 500 μm, inclusive of all values and ranges therebetween. The thickness of the graphite can be as large as desired as long as its size may not interfere with the milling or thinning processes.

In some embodiments, the disclosed grinding or milling processes can be carried out in any type of grinding or milling system that comprises a vessel and allows for the shearing, exfoliation, charging, hydroxylation, etc., of the crystalline precursor graphitic material. Examples of such a system that can be used for the process include milling vessels such as but not limited to ball mills, rod mills, pebble mills, autogenous mills, semi-autogenous mills, roller mills (e.g., jar roller mills, ring mills, frictional-ball mills, etc.), attritors, planetary mills, jet mills, aerodynamic mills, shear mixers, and/or the like. In some embodiments, the mill jars or vessels can be made from conductive materials, insulators and/or semi-conductors, including ceramic materials, alumina, stainless steel, and/or zirconia, and can also be lined with materials such as polyurethane, rubber, etc. In some embodiments, the vessels may include grinding media for aiding in the grinding/shearing of precursor materials such as graphite. In some embodiments, the grinding media can be made from the same type of materials as the vessel or jar in which the grinding media are being used. As such, for example, the vessels and/or the grinding media may be electrically conductive, and comprise materials such as stainless steel, metals and/or alloys (e.g., tungsten carbide). In some embodiments, the vessels and/or the grinding media may be coated with electrically conductive material. In general, the vessels and/or the grinding media may be configured to conduct electric charges. For example, the grinding media can be made from alumina, zirconia, stainless steel, etc. In some embodiments, the grinding media may assume different forms. For example, the grinding media can be at least substantially a ball (hence the common term "ball milling"), at least substantially a cylinder, at least substantially a rod, and in fact any shape capable of aiding in the grinding/shearing of precursor materials. As used herein, the term "grinding media" or "milling balls" refer to any grinder that can be used in the exfoliation and thinning of crystalline graphite in ball milling jars. Even though the common nomenclature "milling balls" is used, the grinding media or the milling balls are not limited to a particular geometry, and can have any desired property such as shape, size, composition, etc.

In some embodiments, the graphitic material (e.g., crystalline graphite), a solvent (e.g., a polar solvent), a grinding media, a metal hydroxide salt, a weak oxidizer, and a surfactant can be added into a milling vessel to commence the milling process. In some embodiments, electrolyte mixtures, may be placed into a milling vessel or jar made from electrically conductive materials such as stainless steel, metal or alloys. In some embodiments, electrolyte mixtures, such as the one in the preceding example, can be milled or rotated for a period of time and at a speed of rotation configured to generate electrostatic charges in the electrolyte mixture. In some embodiments, the speed of the rotation may be configured to reduce the initial thickness of the graphite without substantially affecting its lateral size. For example, the stronger mechanical interaction between the grinding media and the crystalline graphite that could result as a result of higher milling vessel rotational speed can reduce not only the thickness of the crystalline graphite, but also its lateral size.

Accordingly, during the milling process, the milling speed can range from about 10 rotations per minute (rpm) to about 500 rpm. In some embodiments, the milling speed can range from about 10 rpm to about 300 rpm, from about 10 rpm to about 250 rpm, from about 10 rpm to about 150 rpm, from about 10 rpm to about 100 rpm, from about 50 rpm to about 300 rpm, from about 150 rpm to about 250 rpm, from about 200 rpm to about 250 rpm, and/or the like. In some embodiments, the milling speed can be greater than about 1 rpm, about 2 rpm, about 3 rpm, about 4 rpm, about 5 rpm, about 6 rpm, about 7 rpm, about 8 rpm, about 9 rpm, about 10 rpm, about 15 rpm, about 20 rpm, about 25 rpm, about 30 rpm, about 35 rpm, about 40 rpm, about 45 rpm, about 50 rpm, about 55 rpm, about 60 rpm, about 65 rpm, about 70 rpm, about 75 rpm, about 80 rpm, about 85 rpm, about 90 rpm, about 95 rpm, about 100 rpm, about 105 rpm, about 110 rpm, about 115 rpm, about 120 rpm, about 125 rpm, about 130 rpm, about 135 rpm, about 140 rpm, about 145 rpm, about 150 rpm, about 155 rpm, about 160 rpm, about 165 rpm, about 170 rpm, about 175 rpm, about 180 rpm, about 185 rpm, about 190 rpm, about 195 rpm, about 200 rpm, about 225 rpm, about 250 rpm, about 275 rpm, about 300 rpm, about 325 rpm, about 350 rpm, about 375 rpm, about 400 rpm, about 425 rpm, about 450 rpm, about 475 rpm, or greater than about 500 rpm, inclusive of all values and ranges therebetween.

In some embodiments, the duration of the milling process to reduce the thickness of the precursor graphite and arrive at hydroxylated thinned graphite or graphene sheets can range from about from about 1 hours to about 36 hours. In some embodiments, the duration of the milling process may range from about 1 hour to about 24 hours, about 1 hour to about 24 hours, about 1 hour to about 20 hours, about 1 hour to about 19 hours, about 1 hour to about 18 hours, about 1 hour to about 17 hours, about 1 hour to about 16 hours, about 1 hour to about 15 hours, about 1 hour to about 14 hours, about 1 hour to about 13 hours, about 1 hour to about 12 hours, about 1 hour to about 11 hours, about 1 hour to about 10 hours, about 1 hour to about 9 hours, about 1 hour to about 8 hours, about 1 hour to about 7 hours, about 1 hour to about 6 hours, about 1 hour to about 5 hours, about 1 hour to about 4 hours, about 1 hour to about 3 hours, about 1 hour to about 2 hours, about 2 hours to about 36 hours, about 2 hours to about 24 hours, about 2 hours to about 20 hours, about 3 hours to about 19 hours, about 4 hours to about 18 hours, about 5 hours to about 17 hours, about 6 hours to about 16 hours, about 7 hours to about 15 hours, about 8 hours to about 14 hours, about 9 hours to about 13 hours, about 3 hours and about 36 hours, about 4 hours and about 36 hours, about 5 hours and about 36 hours, about 6 hours and about 36 hours, about 7 hours and about 36 hours, about 8 hours and about 36 hours, about 9 hours and about 36 hours, about 10 hours and about 36 hours, about 11 hours and about 36 hours, about 12 hours and about 36 hours, about 13 hours and about 36 hours, about 14 hours and about 36 hours, about 15 hours and about 36 hours, about 16 hours and about 36 hours, about 17 hours and about 36 hours, about 18 hours and about 36 hours, about 19 hours and about 36 hours, about 20 hours and about 36 hours, about 24 hours and about 36 hours, about 28 hours and about 36 hours, or about 32 hours about 36 hours, inclusive of all values and ranges therebetween. In some embodiments, the duration of the milling can be greater than about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, or greater than about 36 hours, inclusive of all values and ranges therebetween. In some embodiments, the duration of the milling can be less than about 36 hours, about 35 hours, about 34 hours, about 33 hours, about 32 hours, about 31 hours, about 30 hours, about 29 hours, about 28 hours, about 27 hours, about 26 hours, about 25 hours, about 24 hours, about 23 hours, about 22 hours, about 21 hours, about 20 hours, about 19 hours, about 18 hours, about 17 hours, about 16 hours, about 15 hours, about 14 hours, about 13 hours, about 12 hours, about 11 hours, about 10 hours, about 9 hours, about 8 hours, about 7 hours, about 6 hours, about 5 hours, about 4 hours, about 3 hours, about 2 hours, or less than about 1 hour, inclusive of all values and ranges therebetween.

In some embodiments, the rotation during the process may generate a shearing force by the grinding media that may be configured to provide enough energy to the electrostatic charges in the electrolyte solution to react with the salts (which may be polarized) in the solution. In some embodiments, the reaction between the electrostatic charges and the metal hydroxide salt may generate atomic oxygen. An additional mechanism for the generation of atomic oxygen in the electrolyte mixture can be through the interaction of the weak oxidizer with the hydroxyl ions that may be present in the mixture (from the metal hydroxide salt, for example). In some embodiments, the weak oxidizer may interact with the hydroxyl ions to release atomic oxygen that may also be used for the exfoliation of the graphite. For example, in some embodiments, the generated and/or released atomic oxygen may diffuse in between layers of the crystalline graphite and increase the in-plane separation. When the in-plane distance passes beyond a certain distance, in some embodiments, inter-planar bonds (covalent, van der Waals, etc.) of graphite may become weak enough that a gentle shearing force may exfoliate the layers from the crystalline graphite. In some embodiments, hydroxyl anions in the electrolyte may also diffuse in between layers of graphite and weaken the inter-layer bonding. In some embodiments, the solvent may also penetrate between layers of the ordered graphite and weaken the forces that hold the layers together, thereby contributing to the thinning of the crystalline graphite during the milling process.

In some embodiments, the number and/or sizes of grinding media in the milling vessel or jar can depend on milling process related factors such as but not limited to the running time, the rotational speed, amount/size of the crystalline graphite, average size of the grinding media, and/or the like. For example, for a given amount of crystalline graphite, there can be some milling ball sizes (conversely number of milling balls) that can be particularly beneficial in effecting a more efficient shearing of crystalline graphite layers depending on the speed and the length of the ball milling process. In some embodiments, the grinding media may be small sized balls and their amount may be chosen based on the amount of crystalline graphite to be treated. For example, the amount of the grinding media may be chosen so that during the milling process, the weight proportion of grinding media to crystalline graphite may be in the range of from about 5:1 to about 20:1. In some embodiments, the proportion of grinding media to crystalline graphite may be in the range of from about 7:1 to about 15:1, from about 9:1 to about 12:1, about 10:1, inclusive of all values and ranges therebetween. In some embodiments, the proportion of grinding media to crystalline graphite can be greater than about 1:1, about 2:1, about 3:1, about 4:1, about 5:1, about 6:1, about 7:1, about 8:1, about 9:1, about 10:1, about 11:1, about 12:1, about 13:1, about 14:1, about 15:1, about 16:1, about 17:1, about 18:1, about 19:1, about 20:1, or greater than about 25:1, inclusive of all values and ranges therebetween. In some embodiments, the average size of the grinding media (e.g., balls) may be in the range of from about 1 mm to about 150 mm, about 2 mm to about 125 mm, about 3 mm to about 100 mm, about 4 mm to about 75 mm, about 5 mm to about 50 mm, about 6 mm to about 25 mm, about 1 mm to about 50 mm, about 2 mm to about 49 mm, about 3 mm to about 48 mm, about 4 mm to about 47 mm, about 5 mm to about 46 mm, about 6 mm to about 45 mm, about 7 mm to about 44 mm, about 8 mm to about 43 mm, about 9 mm to about 42 mm, about 10 mm to about 41 mm, about 11 mm to about 40 mm, about 12 mm to about 39 mm, about 13 mm to about 38 mm, about 14 mm to about 37 mm, about 15 mm to about 36 mm, about 20 mm to about 30 mm, about 10 mm to about 20 mm, about 5 mm to about 15 mm, about 1 mm to about 10 mm, about 8 mm to about 12 mm, inclusive of all values and ranges therebetween. In some embodiments, proportion of grinding media to crystalline graphite can be less than about 50:1, about 45:1, about 40:1, about 35:1, about 30:1, about 25:1, about 20:1, about 15:1, about 14:1, about 13:1, about 12:1, about 11:1, about 10:1, about 9:1, about 8:1, about 7:1, about 6:1, about 5:1, about 4:1, about 3:1, about 2:1, or less than about 1:1, inclusive of all values and ranges therebetween.

In some embodiments, the electrolyte solution in which the milling process takes place comprises polar solvents. An example of a polar solvent may be purified water such as, but not limited to, double distilled deionized water. Other examples include propanol, butanol, acetic acid, ethanol, methanol, formic acid, and/or the like. In some embodiments, some of these solvents may also be used for other purposes during the milling process. For example, ethanol may be used as a de-foaming agent.

In some embodiments, during the milling process, a weak oxidizer may be used to interact with hydroxyl ions to generate atomic oxygen that can intercalate graphite and weaken the interlayer van der Waals bonds. Owing to its conductive characteristics, the weak oxidizer can be used as a dissipating agent for the electrostatic charges produced during the milling process. That is, the weak oxidizer may be configured to assist with the dissipation of the electrostatic charges throughout the electrolyte solution. As used herein, a "weak" oxidizer refers to a chemical agent with an oxidation potential less than about 1.5V. Examples of a weak oxidizer include diluted hydrogen peroxide, chromate, chlorate, perchlorate, and/or the like. In this context, a diluted oxidizer may mean an oxidizer that contains about 30% by weight of the oxidizing agent. For example, a diluted weak hydrogen peroxide oxidizer has about 30% by weight of the oxidizing agent hydrogen peroxide. In some embodiments, the diluted oxidizer may contain from about 10% to about 50%, from about 15% to about 45%, from about 20% to about 40%, from about 25% to about 35%, and/or the like of the oxidizing agent by weight. In some embodiments, the diluted oxidizer may contain greater than about 1% by weight of the oxidizing agent, greater than about 5 wt %, greater than about 10 wt %, greater than about 15 wt %, greater than about 20 wt %, greater than about 25 wt %, greater than about 30 wt %, greater than about 35 wt %, greater than about 40 wt %, greater than about 45 wt %, or greater than about 50 wt %, inclusive of all values and ranges therebetween. In some embodiments, the diluted oxidizer may contain less than about 50% by weight of the oxidizing agent, less than about 45 wt %, less than about 40 wt %, less than about 35 wt %, less than about 30 wt %, less than about 25 wt %, less than about 20 wt %, less than about 15 wt %, less than about 10 wt %, less than about 5 wt %, or less than about 1 wt %, inclusive of all values and ranges therebetween.

In some embodiments, a metal hydroxide salt configured to interact with electrostatic charges to produce metal and hydroxide ions can be added into the grinding vessel or jar of the process disclosed herein. As discussed above, the hydroxyl ions may further interact with electrostatic charges to generate atomic oxygen that can intercalate crystalline graphite and weaken the interlayer van der Waals bonds so as to facilitate the shearing of the graphene sheets of the graphite. In some embodiments, the hydroxide ions can also diffuse into the interlayer spacing of the layered crystalline precursor graphite to intercalate graphite and facilitate the exfoliation of graphene sheets by the shearing forces generated during the rotation of the grinding vessel or jar. In some embodiments, the metal hydroxide salt can be formed from a combination of a hydroxyl ion and a metal selected from alkali metals, alkaline earth metals, boron group elements, etc. Examples of metal hydroxide salts that can be used for the disclosed processes include hydroxides of Li, Na, K, Cs, Be, Mg, Ca, Sr, Ba, B, Al, Ga, In, Cs, Rb, Ti, mixtures thereof, and/or the like. In some embodiments, the amount of metal hydroxide salt to be used in the disclosed processes can assume a wide range of values. For example, in some embodiments, the amount of metal hydroxide salt can range from about 1% to about 50% by weight of the electrolyte solution. In some embodiments, the amount of metal hydroxide salt can range from about 2 wt % to about 45 wt %, about 3 wt % to about 40 wt %, about 4 wt % to about 35 wt %, about 5 wt % to about 25 wt %, about 10 wt % to about 20 wt %, about 14 wt % to about 16 wt %, inclusive of all values and ranges therebetween. In some embodiments, the amount of metal hydroxide salt can be greater than about 1 wt %, about 2 wt %, about 3 wt %, about 4 wt %, about 5 wt %, about 6 wt %, about 7 wt %, about 8 wt %, about 9 wt %, about 10 wt %, about 15 wt %, about 20 wt %, about 25 wt %, about 30 wt %, about 35 wt %, about 40 wt %, about 45 wt %, or greater than about 50 wt %, inclusive of all values and ranges therebetween. In some embodiments, the amount of metal hydroxide salt can be less than about 50 wt %, about 45 wt %, about 40 wt %, about 35 wt %, about 30 wt %, about 25 wt %, about 20 wt %, about 15 wt %, about 10 wt %, about 9 wt %, about 8 wt %, about 7 wt %, about 6 wt %, about 5 wt %, about 4 wt %, about 3 wt %, about 2 wt %, or less than about 1 wt %, inclusive of all values and ranges therebetween. In some embodiments, the amount may be any amount equal to or less than the maximum amount that is soluble in the electrolyte solution. In some embodiments, in particular for the purpose of doping resulting graphene sheets with metal particles, the amount of metal hydroxide salt can be increased to about 90% of the solution by volume.

In some embodiments, the type of metal hydroxide salt that may be used in the process may depend on the desired production yield of the process to reduce the precursor crystalline graphite into thinned and charged graphene sheets. In some embodiments, production yield may be defined as the proportion of precursor graphitic material that has been reduced to thinned graphite of a defined number of graphene layers or less. In some embodiments, the production yield of the process may vary based on the type of metal that is part of the metal hydroxide salt. For example, in some embodiments, for a high production yield of greater than about 60% (i.e., greater than about 60% of the precursor graphite by weight is converted into thinned graphene of about 10 layers as a result of the process), the metal that is part of the metal hydroxide salt may be a member of the alkali and/or alkaline earth metals, comprising Li, Na, K, Cs, Be, Mg, Ca, Sr and Ba. In some embodiments, for a low production yield of less than about 60%, the metal may be a member of the boron group elements, comprising B, Al, Ga, In, and Ti. In some embodiments, the metal hydroxide salt used in the milling or grinding processes disclosed herein may be a single metal hydroxide salt comprising a metal and a hydroxide ion, and in some embodiments, the metal hydroxide salt may be a mixture of any of the above-identified metal hydroxide salts.

In some embodiments, surfactants can be included in the process so as to avoid or minimize clamping of the end products of the process. Further, surfactants may increase the conductivity of the mixture in the grinding vessel, allowing for an increased diffusion of the hydroxyl ions and thereby contributing to the exfoliation of graphene layers from the crystalline graphite as discussed above. In addition, surfactants may be used to facilitate the mixing of polar and non-polar solvents that in general are adverse to mixing. Further, surfactants may also be used to facilitate contact between an ingredient that is adverse to mixing with a given solvent and the solvent. For example, surfactants may be used to facilitate contact between hydrophobic graphite materials and water. Examples of surfactants that can be used for such purpose during process comprise sodium dodecyl sulfate, sodium dodecyl benzene sulfonate, pyridinium (PY+), thionin acetate salt, triton, mixtures thereof, and/or the like.

In some embodiments, the concentration of surfactants to be used during the milling processes can be determined based on the desire to maintain balance between the thinning of the crystalline graphite and the reduction in its lateral size. As discussed above, in some embodiments, surfactants enhance the shearing force on crystalline graphite and facilitate the thinning of the crystalline graphite. On the other hand, a large amount of surfactants (e.g., more than the amount used to avoid or minimize agglomeration of crystalline graphite) can lead to reduction in lateral size, which may be undesirable in some circumstances. Accordingly, in some embodiments, an average concentration of between about 1 μMolar and about 200 μMolar of surfactants can be considered sufficient during the thinning and charging processes of precursor graphite. In some embodiments, the average concentration may range from about 0.05 μMolar to about 150 μMolar, about 0.1 μMolar to about 100 μMolar, about 0.15 μMolar to about 100 μMolar, about 0.2 μMolar to about 100 μMolar, about 0.25 μMolar to about 100 μMolar, about 0.3 μMolar to about 100 μMolar, about 0.35 μMolar to about 100 μMolar, about 0.4 μMolar to about 100 μMolar, about 0.45 μMolar to about 100 μMolar, about 0.5 μMolar to about 100 μMolar, about 0.55 μMolar to about 100 μMolar, about 0.6 μMolar to about 100 μMolar, about 0.65 μMolar to about 100 μMolar, about 0.7 μMolar to about 100 μMolar, about 0.75 μMolar to about 100 μMolar, about 0.8 μMolar to about 100 μMolar, about 0.85 μMolar to about 100 μMolar, about 0.9 μMolar to about 100 μMolar, about 0.95 μMolar to about 100 μMolar, about 1 μMolar to about 100 μMolar, about 10 μMolar to about 50 μMolar, about 50 μMolar to about 100 μMolar, or about 0.2 μMolar to about 5 μMolar, inclusive of all values and ranges therebetween. In some embodiments, the average concentration of surfactant can be greater than about 0.001 μMolar, about 0.01 μMolar, about 0.1 μMolar, about 0.15 μMolar, about 0.2 μMolar, about 0.25 μMolar, about 0.3 μMolar, about 0.35 μMolar, about 0.4 μMolar, about 0.45 μMolar, about 0.5 μMolar, about 0.55 μMolar, about 0.6 μMolar, about 0.65 μMolar, about 0.7 μMolar, about 0.75 μMolar, about 0.8 μMolar, about 0/85 μMolar, about 0.9 μMolar, about 0.95 μMolar, about 1 μMolar, about 5 μMolar, about 10 μMolar, about 20 μMolar, about 30 μMolar, about 40 μMolar, about 50 μMolar, or about 100 μMolar, inclusive of all values and range therebetween.

In some embodiments, the electrolyte solution used for the milling process can have a very conductive and alkaline environment. For example, the pH level may range from almost neutral to very strong basic. In some embodiments, the pH level may range from about 8 to about 14, from about 9 to about 14, from about 9 to about 11, from about 12 to about 14, and/or the like. The alkalinity may follow as a result of the small ionization potential of metal hydroxide salt upon dissolving in the solvent(s) of the electrolyte solution.

In some embodiments, the milling process may be interrupted every so often to allow the escape of gas for various reasons (e.g., safety). For example, in some embodiments, the milling process may be stopped about every 30 minutes to evacuate gas by-products that are produced during the rotation/milling of the milling vessel. In some embodiments, the process of milling may also be performed in a manner designed to avoid evaporation of solvents such as water from the aqueous electrolyte solution. For example, milling vessels or jars used in the milling processes may be kept at a temperature formulated to avoid evaporation of the solvents, an example being room temperature.

In some embodiments, the resulting product of the milling may appear black and possess a fluffy structure. This resulting product may be post-processed to at least remove extraneous by-products or residues such as, but not limited to, metallic ions, surfactants, metal salts, etc. For example, the product may be removed from the milling vessel or jar and washed with one or more of water, hydrochloric acid (HCl), ethanol, and/or the like. In some embodiments, the washing may be followed by vacuum filtration and vacuum drying. In some embodiments, the resulting product can be single or thinned few layer graphene sheets that are highly charged and hydroxylated mainly at the edges.

In some embodiments, the precursor and/or the resulting thinned graphite may not have a regular shape that allows for a convenient identification of a measure of a lateral size, or even a thickness. For example, as described herein, the precursor graphite can assume different forms, including rods, fibers, powders, flakes, and/or the like. However, in some embodiments, depending on at least the geometry of the precursor graphite/thinned graphite, generalized definitions of thickness and/or lateral size can be used in characterizing these quantities. In some embodiments, the thickness and/or the in-plane lateral size of crystalline graphite in irregular forms can be characterized by a suitable linear dimension, and/or average of linear dimensions.

For example, the thickness can be defined as some suitable length (e.g., height from topmost layer to bottom-most layer of a regularly layered graphite flake, average height if irregularly shaped, etc.) in substantially the same direction as the direction normal to the surfaces of the layered graphene sheets. As another example, the lateral size of crystalline graphite may be defined by some appropriate linear dimension and/or combination of dimensions along the surface of the graphite (e.g., radius, diameter, average of several linear dimensions along the surface, a linear dimension appropriately normalized by shape factors that take the geometrical irregularity of the graphite into consideration, etc.). In any case, suitable linear dimensions that characterize the thickness and the lateral size of crystalline graphite in a reasonable manner may be used in defining the aspect ratio as the ratio of the lateral size to the thickness. For example, if the in-plane shape of the material cannot be modeled by regular geometrical objects relatively accurately, the linear dimension can be expressed by characteristic parameters as is known in the art (e.g., by using shape or form factors).

In some embodiments, the graphitic material produced from the disclosed milling process may include graphene or thinned graphite materials with lateral sizes that are comparable to the precursor graphite but with thickness of few graphene layers, including single layer graphene sheet. For example, in some embodiments, the average lateral sheet size of the graphene sheets can be about 500 µm while the average number of layers may be between about 1 graphene layer and about 100 graphene layers. In some embodiments, the average lateral sheet size of the graphene sheets can be between about 100 nm and about 500 µm, about 200 nm and about 450 µm, about 300 nm and about 400 µm, about 400 nm and about 350 µm, about 500 nm and about 300 µm, about 600 nm and about 250 µm, about 700 nm and about 200 µm, about 800 nm and about 150 µm, about 900 nm and about 100 µm, about 100 nm and about 450 µm, about 100 nm and about 400 µm, about 100 nm and about 350 µm, about 100 nm and about 300 µm, about 100 nm and about 250 µm, about 100 nm and about 200 µm, about 100 nm and about 150 µm, about 100 nm and about 100 µm, about 100 nm and about 1,000 nm, about 100 nm and about 900 nm, about 100 nm and about 800 nm, about 100 nm and about 700 nm, about 100 nm and about 600 nm, about 100 nm and about 500 nm, about 100 nm and about 400 nm, about 100 nm and about 300 nm, about 100 nm and about 200 nm, about 200 nm and about 500 µm, about 300 nm and about 500 µm, about 400 nm and about 500 µm, about 500 nm and about 500 µm, about 600 nm and about 500 µm, about 700 nm and about 500 µm, about 800 nm and about 500 µm, about 900 nm and about 500 µm, about 1,000 nm and about 500 µm, about 100 µm and about 500 µm, about 150 µm and about 500 µm, about 200 µm and about 500 µm, about 250 µm and about 500 µm, about 300 µm and about 500 µm, about 350 µm and about, about and about 500 µm, about 400 µm and about 500 µm, or about 450 µm and about 500 µm, inclusive of all values and ranges therebetween. In some embodiments, the average number of layers can be between 1 graphene layer and about 100 graphene layers, about 2 graphene layers and about 95 graphene layers, about 3 graphene layers and about 90 graphene layers, about 4 graphene layers and about 85 graphene layers, about 5 graphene layers and about 80 graphene layers, about 6 graphene layers and about 75 graphene layers, about 7 graphene layers and about 70 graphene layers, about 8 graphene layers and about 65 graphene layers, about 9 graphene layers and about 60 graphene layers, about 10 graphene layers and about 55 graphene layers, about 11 graphene layers and about 50 graphene layers, 1 graphene layer and about 95 graphene layers, 1 graphene layer and about 90 graphene layers, 1 graphene layer and about 85 graphene layers, 1 graphene layer and about 80 graphene layers, 1 graphene layer and about 75 graphene layers, 1 graphene layer and about 70 graphene layers, 1 graphene layer and about 65 graphene layers, 1 graphene layer and about 60 graphene layers, 1 graphene layer and about 55 graphene layers, 1 graphene layer and about 50 graphene layers, 1 graphene layer and about 45 graphene layers, 1 graphene layer and about 40 graphene layers, 1 graphene layer and about 35 graphene layers, 1 graphene layer and about 30 graphene layers, 1 graphene layer and about 25 graphene layers, 1 graphene layer and about 20 graphene layers, 1 graphene layer and about 19 graphene layers, 1 graphene layer and about 18 graphene layers, 1 graphene layer and about 17 graphene layers, 1 graphene layer and about 16 graphene layers, 1 graphene layer and about 15 graphene layers, 1 graphene layer and about 14 graphene layers, 1 graphene layer and about 13 graphene layers, 1 graphene layer and about 12 graphene layers, 1 graphene layer and about 11 graphene layers, 1 graphene layer and about 10 graphene layers, 1 graphene layer and about 9 graphene layers, 1 graphene layer and about 8 graphene layers, 1 graphene layer and about 7 graphene layers, 1 graphene layer and about 6 graphene layers, 1 graphene layer and about 5 graphene layers, 1 graphene layer and about 4 graphene layers, 1 graphene layer and about 3 graphene layer, and 1 graphene layer and about 2 graphene layers, inclusive of all values and ranges therebetween. In some embodiments, the average number of graphene layers can be less than about 100 graphene layers, about 95 layers, about 90 layers, about 85 layers, about 80 layers, about 75 layers, about 70 layers, about 65 layers, about 60 layers, about 55 layers, about 50 layers, about 45 layers, about 40 layers, about 35 layers, about 30 layers, about 25 layers, about 20 layers, about 19 layers, about 18 layers, about 17 layers, about 16 layers, about 15 layers, about 14 layers, about 13 layers, about 12 layers, about 11 layers, about 10 layers, about 9 layers, about 8 layers, about 7 layers, about 6 layers, about 5 layers, about 4 layers, about 3 layers, about 2 layers, or a single graphene layer, inclusive of all values and ranges therebetween.

In some embodiments, the quality of the thinned product and/or the efficiency of the thinning process can be represented by a parameter such as an aspect ratio that incorporates information on the thickness and the lateral size of the thinned graphitic material. For example, one may define the aspect ratio as the ratio of lateral size or in-plane dimension to thickness. Note that other definitions for an aspect ratio are possible and may be adopted based on the circumstances of the situation (e.g., based on geometry of the product, etc.). In general, the aspect ratio provides information on the "efficiency" and/or effectiveness of producing thinned graphite while avoiding or minimizing reduction in lateral sheet size. For example, if a thinned crystalline graphite product has an average lateral dimension of 300 µm and a thickness of 200 nm, the aspect ratio as defined above becomes 300,000/200 (i.e., 1,500). However, a process that reduces the thickness of the same precursor graphite to 100 nm while attaining average lateral dimension of 100 µm (i.e., aspect ratio of 1,000) may be deemed as less efficient, and the end result may be considered as lower quality in comparison to the previous example (even with a thinner end result) since the lateral size is reduced comparatively on a larger scale.

In some embodiments, the graphene sheets may be highly electrostatically charged and may contain hydroxyl molecules that reside mostly on the edges rather than towards the center of the surfaces of the graphene sheets. As such, this may lead to the selective functionalization of the edges in comparison to the entire surfaces of the thinned graphene sheets.

In some embodiments, the processes disclosed herein for thinning precursor graphitic materials can produce thinned graphite (e.g., single layer, bilayer, few-layer and multi-layer graphene, etc.) of varied thicknesses and lateral sizes. For example, the disclosed thinning process can achieve thinned end products with thickness (as defined above, for example) less than about 1,500 layers (approximately 500 nm), about 400 nm, about 300 nm, about 200 nm, about 100 nm, about 50 nm, about 30 nm, about 10 nm, etc. In some embodiments, the lateral sizes (as defined above, for example) of the thinned end products may be as large as about 500 µm, about 250 µm, about 100 µm, about 1000 nm, about 500 nm, about 250 nm, about 100 nm, about 50 nm, about 10 nm, etc. As such, thinned graphitic products with a wide range of aspect ratios ranging from about 10 nm/500 nm (about 0.2) to about 500 µm/10 nm (about 50,000) can be obtained from the thinning processes disclosed in the instant application.

Classification of Milled Graphitic Material

In some embodiments, the milling process can be employed experimentally to reduce the thickness of precursor crystalline graphite and produce highly electrostatically charged, hydroxylated graphene sheets. Examples of graphitic material, methods for manufacturing the same, and methods for characterizing the same can be found in the '683 Publication. In some embodiments of the experimental results, at least some of these graphene sheets can be conveniently classified into the following classes or grades:

Grade A: A few-layer graphene powder of about 3 to 4 graphene layers and lateral size (e.g., flake diameter) of about 5 µm to about 20 µm. These graphene sheets have been found to exhibit highly activated edges and low defect density.

Grade B: A few-layer graphene powder of about 2 to about 3 graphene layers and lateral size (e.g., flake diameter) of about 0.5 µn to about 5 µm. These graphene sheets have been found to exhibit highly activated edges and low defects.

Grade C: A few-layer graphene powder with similar properties as Grade A, but with moderately activated edges.

Grade D: A few-layer graphene powder with similar properties as Grade B, but with moderately activated edges.

In some embodiments, the lateral sizes and the thicknesses of these various grades may be obtained from any number of experimental techniques.

With respect to thickness and defect density of the resulting products of the milling process, in some embodiments, Raman spectroscopy can be used to characterize these properties. In some embodiments, visible light (e.g., 532 nm wavelength light corresponding to 2.33 eV energy) may be used to obtain Raman spectra for bulk crystalline graphite, Grade A few layer graphene, Grade B few layer graphene, Grade C few layer graphene, and Grade D few layer graphene. In some embodiments, the Raman spectra for all the grades may show peaks that are the result of in-plane vibrational modes caused by excitations due to the laser used for the spectroscopy. These peaks or bands include the primary in-plane mode of the so-called G band around wavenumber 1580 cm$^{-1}$, a different in-plane vibration mode of the so-called D band around wavenumber 1300 cm$^{-1}$, and a second-order overtone of the D band, the so-called 2D band around wavenumber 2700 cm$^{-1}$. Analysis of the D peaks as discussed in *Phys. Rev. Lett.,* 97, 187401 (2006) and *Journal of Physics*: Conference Series 109 (2008) 012008, the entire contents of both of which are incorporated herein by reference in its entireties, can provide information on the thicknesses of the graphene sheets of the different grades resulting from the disclosed milling processes. In some embodiments, one may also use the techniques disclosed in *J. Raman Spectrosc.* 2009, 40, 1791-1796, the entire contents of which is incorporated herein by reference in its entirety, to analyze the G peaks and evaluate the number of layers in the graphene sheets. Further, in some embodiments, an analysis of the D peaks and the G band with respect to each other may reveal information on defect density of the graphene sheets. For example, the ratio of the intensity at the G band to the intensity at the D band may serve as a parameter for characterizing defect density. For example, a large ratio may indicate the presence of little or no defects in the resulting graphene products while a small value of the ratio indicates large defect presence. From the results of the Raman spectroscopy, the average value of the ratio for the graphene sheets of Grades A, B, C, and D can be calculated to be about 20, a large value indicating low numbers of defects in the resulting graphene sheets of the milling process (and further indicating that the graphene sheets have large sizes).

With respect to the analysis of the D peaks, in some embodiments, changes in shape, width, and position of the 2D peaks of the Raman spectra may be used to identify the thicknesses of the grades of graphene sheets being investigated. Using the techniques discussed in the above noted Journal of Physics article (*Journal of Physics*: Conference Series 109 (2008) 012008), a two peaks deconvolution using Lorentzian functions can be chosen, indicating that the number of layers exceeded two. In some embodiments, an analytical comparison of the 2D peaks amongst the different grade graphene sheets may reveal that the 2D peak shifts from a higher wavenumber for crystalline graphite with large number of graphene sheets to a lower wavenumber for few-layer graphene such as the thinned products of Grade D. In some embodiments, one may compare the 2D peak positions for the different grades with the data provided in *Chem. Comm.*, 2011, 47, 9408-9410, the entire contents of which is incorporated herein by reference in its entirety, to establish the number of layers in the graphene sheets of Grades A-D and bulk crystalline graphite. A tabulation of the 2D peaks and the number of layers for each grade is given in the table below:

| Sample | $2D_A$ peak position | $2D_B$ peak position | Number of layers |
|---|---|---|---|
| Graphite | 2682.03 cm$^{-1}$ | 2716.67 cm$^{-1}$ | >=10 |
| Grade A | 2665.26 cm$^{-1}$ | 2700.34 cm$^{-1}$ | 2 to 3 |
| Grade B | 2666.09 cm$^{-1}$ | 2703.01 cm$^{-1}$ | 4 to 5 |
| Grade C | 2666.28 cm$^{-1}$ | 2702.82 cm$^{-1}$ | 2 to 3 |
| Grade D | 2666.37 cm$^{-1}$ | 2699.72 cm$^{-1}$ | 4 to 5 |

With respect to the analysis of the G peak, in some embodiments, one may employ the disclosure of the noted J. Raman Spectroscopy article (*J. Raman Spectrosc.* 2009, 40, 1791-1796) to perform an empirical evaluation of the number of layers can also be determined from G peak position using the equation $$N = N_{Graphite} - \frac{K}{1 + n^{1.6}}$$

where N is the wavenumber of the G peak of the few-layer graphene, n is the number of layers, $N_{Graphite}$ is the wavenumber of bulk graphite corresponding to large value of n (e.g., n>10), and K a calculated coefficient. For example, using the wavenumber for the aforementioned G peaks of Grade A-D, and setting the wavenumber of bulk graphite $N_{Graphite}$ to be about 1579.38 cm$^{-1}$, the coefficient K can be calculated to be about 54±3. In some embodiments, this method of evaluation gives some consistent results for grades B and D with about 2 to 3 layers; however, in some embodiments, a small difference can be observed for Grades A and B indicating up to 4 layers (e.g., instead of 3). From a synthesis of the above two methods (analysis of the D peaks and the G peaks) of determining the number of layers in samples of Grades A-D, in some embodiments, a reasonable determination of about 2-3 layers for Grades B and D and about 3-4 for Grades A and C can be made.

As mentioned above, in some embodiments, graphene sheets that are the result of the milling step of the disclosed process are highly charged and contain edges that are hydroxylated, i.e., hydroxyl groups (OH$^-$) are bonded to the edges of the graphene sheets. The appearance of hydroxyl groups at the edges serve as chemical "hooks" for the graphene sheets, and an experimental technique such as X-ray Photon Spectroscopy (XPS) may be used to identify the hydroxyl groups and/or characterize the surfaces.

Confirmation of the presence of hydroxyl groups at the edges of the graphene sheets may be obtained from other techniques such as Fourier transform infrared spectroscopy by attenuated total reflection (ATR-FTIR), which may be used to characterize the edge activation and other properties of the various grades. In some embodiments, all grades may exhibit the C—O stretching mode around 1060 cm$^{-1}$ and the C—OH stretching mode around 1200 cm$^{-1}$. These modes confirm the presence of hydroxyl groups over the graphene flakes. Around 1600 cm$^{-1}$, the vibration of graphitic domains is observed for the graphene sheets of grades A-D, but not for bulk graphite due to the high number of graphitic layers. This is further evidence that graphene sheets of grades A through D comprise few-layers of graphene, unlike the bulk or large numbers for graphite. The O—H stretching mode around 3400 cm$^{-1}$ has been observed only on the 13.2 (Grade C). This mode was also expected on all other grades.

In some embodiments, the thermal stability of the graphene sheets of grades A-D may be investigated via a thermogravimetric analysis (TGA) that tracks the thermal transitions of the materials as a function of temperature, transitions such as, but not limited to, loss of solvent and plasticizers in polymers, water of hydration in inorganic materials, and/or decomposition of the material. For example, a TGA analysis can be performed for each grade by raising the temperature of a furnace containing the graphene sheets and measuring the sample weight. For grades A, B, C and D, the degradation may start at around 690° C., in contrast to about 800° C. for graphite and about 600° C. for a graphene layer, indicating that these grades comprise few-layer graphene products, agreeing with the results of other measurements such as Raman spectroscopy. In some embodiments, loss prior to degradation has been observed (e.g., at less than 2%) and can be ascribed primarily to residues from the washing process. The results in general show the heat resistance properties of grades A-D graphene sheets.

Optional Functionalization of Graphitic Material

In some embodiments, the aforementioned milling process may bring about not only the thinning of precursor graphite into single, few-layer and/or multi-layer graphene sheets, but also the charging and functionalization of the thinned graphitic material. In some embodiments, the thinning and/or functionalization of graphite can be facilitated by oxidizers that may play varied roles based on their oxidation potential. For example, during the thinning process, an oxidizer, in particular a "weak" oxidizer, may be used to facilitate the shearing of sheets of graphene from the precursor graphite. In some embodiments, this can be accomplished when the oxidizer interacts with electrostatic charges in the electrolyte solution comprising the oxidizer and causes the release of atomic oxygen, which then intercalates the layered crystalline graphite and weakens the bonds between the layers. In some embodiments, a "weak"

oxidizer refers to a chemical agent with an oxidation potential less than about 1.5V, about 1.25V, about 1.0V, about 0.75V, about 0.5V, about 0.25V, about 0V, about −1V, about −2V, about −3V, etc.

In some embodiments, during the milling process, a "strong" oxidizer may be used to facilitate the conversion of hydroxyls bonded to the edges of a hydroxylated graphitic material into carbonyl groups. In other words, the strong oxidizer leads to the at least partial oxidization of graphene sheets where hydrogen atoms from the hydroxyls at the hydroxylated edges are released, leaving behind oxygen doubly bonded to a carbon atom, i.e., partially oxidized graphene sheets. In some embodiments, the oxidizers capable of facilitating the conversion of hydroxyls to carbonyls have strong oxidation potentials, hence the term "strong" oxidizer. In some embodiments, a "strong" oxidizer refers to a chemical agent with an oxidation potential greater than about 1.5V, about 1.6V, about 1.75V, about 1.9V, about 2.25V, about 2.5V, about 2.75V, about 3V, etc.

In some embodiments, the graphitic material produced from the milling of crystalline graphite can be combined with a slurry that includes at least an metal hydroxide salt, a strong oxidizer, and an aqueous solution including a polar solvent (e.g., water), a non-polar solvent (e.g., acetonitrile), a weak oxidizer and a surfactant. This combination may be effected in several ways. For example, the resulting graphene products may be transferred into a second grinding vessel containing at least some of the ingredients (e.g., metal hydroxide salt, strong oxidizer, non-polar solvent, polar solvent, weak oxidizer, and/or surfactant). In some embodiments, ingredients that are particularly used during the second milling/functionalization step such as, but not limited to, the strong oxidizer, the non-polar solvent, etc., may be added into the first milling vessel rather than transferring the milled graphitic material into a second milling vessel. In any case, in some embodiments, the combination comprising the graphene products of the above-described milling process, a strong oxidizer, a weak oxidizer, a polar solvent, a non-polar solvent, a metal hydroxide salt, and a surfactant may be rotated in a milling vessel (e.g., attritor) for a period of time at a desired rotation speed. In some embodiments, the resulting hydroxylated product may appear to be brown and exhibit a fluffy structure. In some embodiments, the resulting product may be post-processed (e.g., filtered, washed, dried, and/or the like). In some embodiments, the resulting product can be at least partially oxidized thinned graphene sheets with hydroxylated edges where at least part of the hydroxyls bonded to the edges of the graphene sheets are converted into carbonyl molecules. As the carbonyl molecules tend to be more active for bonding than the hydroxyl groups, in some embodiments, the resulting at least partially oxidized graphene sheets represent an enhanced dispersibility and/or mixability in different kinds of solutions including polar and non-polar solvents.

Agglomeration of Graphitic Material

Typically, graphitic material prepared according to the methods described above may aggregate and not disperse uniformly throughout the polymer. Ultrasonication for liquid resins, and compounder and extrusion for thermoplastics via melt mixing have been used to de-aggregate aggregated graphene nanoflakes and disperse them well into polymers. Ultrasonication can be effective in de-agglomerating graphene nanoflakes in liquid media, and can even facilitate further exfoliation of graphene. However, due to limited dispersibility of graphene in liquid media, typically in the range of about 0.1 to about 1 mg/ml, as well as long processing time required, it may be challenging to apply the method at large scales for commercial applications. Moreover, graphene nanoflakes in a dispersion solution may not be stable in that the flakes tend to agglomerate and precipitate out of the solution. Although surfactants can be used to improve the stability to a certain degree, in some embodiments, settling of graphene nanoflakes may occur, which can be undesirable for the practical application of graphene in many areas such as coatings, paints, and printing materials. In some embodiments, in particular for coating applications, it would be desirable to have an in-situ graphene exfoliation and coating technology to avoid the difficulties associated in preparing stable graphene-containing coating solutions.

On the other hand, although melt mixing of graphene with thermoplastics can be implemented using commercial compounder and extruder via one of the various mixing methods, including melt compounding, solvent blending, and in-situ polymerization. In some embodiments, melt compounding can be less effective in dispersing exfoliated graphene in polymer matrices. In some embodiments, an improved dispersion of graphene in polymer may be achieved by initially dispersing graphene nanoplatelets in a non-solvent by sonication, followed by further mixing with polymer to produce polymer particles uniformly coated with graphene nanoplatelets prior to melt mixing. The improved dispersion of the graphene in polymer can be deduced from the lower electrical percolation threshold of the graphene nanoplatelet/polypropylene composite.

As described in the '683 Publication, melt mixing efficiency was improved by suspending graphene nanoflakes in a solution of first polymer particles, subsequently followed by the spray coating of second polymer particles to yield a core-shell structure. However, the droplets sizes in the spray coating were generally large (for example greater than about 10 μm), and in combination with the adhering effect of the first polymer in the sprayed droplets, there was little or no de-agglomeration or exfoliation of graphene nanoflakes. The graphene coated polymer particles were then subjected to injection molding and the volume resistivity and gas barrier properties were evaluated. Decreases in volume resistivity can be observed for graphene modified materials after graphene coated polymer particles are subjected to injection molding, however, there was little or no obvious improvement in gas barrier properties, suggesting an insufficient dispersion of graphene. Thus, in some embodiments described herein, for effective melt mixing, a pre-exfoliation and mixing of exfoliated graphene nanoflakes with polymer particles or pellets may be desirable. In some embodiments, the present disclosure provides methods of effectively de-agglomerating and/or exfoliating graphene nanoflakes for pre-mixing graphene nanoflakes with polymers prior to melt mixing, as well as further exfoliation of the graphitic material during melt mixing. According to the '683 Publication, there is no opportunity for further exfoliation of the graphitic material during melt mixing, which is why pre-exfoliation and electrospray deposition are suggested. Therefore, the methods described herein and materials manufactured therefrom represent clearly a non-obvious solution to further exfoliation of the graphitic material and formation of a superior graphene/polymer matrix structure as compared to the '683 Publication.

Graphitic Material-Polymer Composites

As described herein, methods of manufacturing a master batch of graphitic material dispersed in a polymer material can be carried out that better disperse the graphitic material into the polymer material and lead to further exfoliation of the graphitic material.

FIG. 1 illustrates a method of manufacturing a master batch that includes a graphitic material dispersed in a polymer material 10, including mixing a graphitic material and a polymer for a first time period to form a first mixture 11. In some embodiments, the graphitic materials and polymeric materials can include any suitable materials as described herein or any known to one of skill in the art. In some embodiments, the graphitic material and the polymer material can be mixed in a mixing vessel. In some embodiments, the graphitic material can be mixed with the polymer material prior to being transferred to the mixing vessel. In some embodiments, the polymer material can be transferred into the mixing vessel at a first time and the graphitic material can be transferred into the mixing vessel at a second time. In some embodiments, the graphitic material can be mixed with a portion of the polymer material to form a first admixture and the first admixture can be mixed with the remaining portion of the polymer to form a second admixture.

In some embodiments, the polymer can comprise soluble or dispersible polymer precursors, oligomers, or polymers, examples of which include polyethylene, polypropylene, polyolefins, acrylonitrile butadiene styrene, poly(meth)acrylates, polystyrene, polyamides, polyesters, polycarbonate, polyurethane, polyimides, polysulfones, poly(aryl ether ketone)s, fluorinated polymers, thermoplastic elastomers (TPE) including thermoplastic polyurethane (TPU), ethylene butyl acrylate (EBA), ethylene-vinyl acetate (EVA), polylactic acid (PLA), polyetherketone (PEK), polyether ether ketone (PEEK), acrylonitrile styrene acrylate (ASA), polyoxymethylene (POM), polyphenylene sulfide (PPS), polyphenylsulfone (PPSU), and other thermosets including thermoset polyurethane, thermoset polyester, epoxy, silicone rubber, and combinations thereof, etc. In some embodiments, the weight ratio of the polymer precursors, oligomers, or polymers to graphitic material can be in the range of about 0.0001 to about 5,000, about 0.001 to about 2,500, about 0.01 to about 1,000, about 0.01 to about 500, about 0.05 to about 100, about 0.05 to about 50, about 1 to about 50, about 0.05 to about 0.5, about 5 to about 100, about 5 to about 50, or about 50 to about 100, inclusive of all values and ranges therebetween. In some embodiments, the weight ratio of the polymer precursors, oligomers, or polymers to graphitic material can be greater than about 0.0001, about 0.001, about 0.01, about 0.1, about 0.5, about 1, about 2, about 3, about 4, about 5, about 6, about 7, about 8, about 9, about 10, about 15, about 20, about 25, about 30, about 35, about 40, about 45, about 50, about 55, about 60, about 65, about 70, about 75, about 80, about 85, about 90, about 95, about 100, about 200, about 300, about 400, about 500, about 1,000, about 2,500, or about 5,000, inclusive of all values and ranges therebetween.

In some embodiments, the term "polymer precursors" is used to refer to reactive monomers, oligomers, or polymers that can subsequently react by itself or with other chemicals, with or without the presence of catalyst, to produce polymers. The term "oligomers" may refer to macromolecules that have higher molecular weight than small molecules but lower molecular weight than polymers, for example, the molecular weight can be in the range of about 100 to about 10,000, in the range of about 500 to about 8,000, etc. Suitable oligomers can be linear, branched, star shaped, or dendritic in structure. The term "polymer" may refer to macromolecules that have a molecular weight, for example, the number average molecular weight (Mn), higher than about 10,000. The polymers can have linear structures, branched structures, hyperbranched structures, or dendritic structures, or the polymers can be homopolymers, random copolymers, blocked copolymers, or polymers with gradient structures, or the polymers can be crystalline or amorphous or liquid crystalline, or the polymers can be thermoplastic or thermoset.

In some embodiments, the mixing can be carried out according to any suitable process, including but not limited to extrusion, hot extrusion, cold extrusion, friction extrusion, microextrusion, single-auger extrusion, tandem extrusion, twin-auger extrusion, co-rotating twin-auger extrusion, counter-rotating twin-auger extrusion, twin screw extrusion, co-rotating twin screw extrusion, counter-rotating twin screw extrusion, horizontal hydraulic press extrusion, direct extrusion, indirect extrusion, backwards extrusion, hydrostatic extrusion, blown film extrusion, sheet/film extrusion, tubing extrusion, over-jacketed extrusion, co-extrusion, extrusion coating, injection molding, pultrusion, other suitable processes, and combinations thereof.

In some embodiments, the mixing vessel can have a scale measured by a static volume, a volume processing capacity, a linear length of extrusion, an extruder diameter, or a screw diameter. In some embodiments, the mixing vessel can have a scale from about 0.01 $m^3$ to about 150 $m^3$, about 0.1 $m^3$ to about 125 $m^3$, about 0.25 $m^3$ to about 100 $m^3$, about 0.5 $m^3$ to about 75 $m^3$, about 0.75 $m^3$ to about 50 $m^3$, about 1 $m^3$ to about 25 $m^3$, about 0.01 $m^3$ to about 125 $m^3$, about 0.01 $m^3$ to about 100 $m^3$, about 0.01 $m^3$ to about 75 $m^3$, about 0.01 $m^3$ to about 50 $m^3$, about 0.01 $m^3$ to about 25 $m^3$, or about 0.01 $m^3$ to about 15 $m^3$, inclusive of all values and ranges therebetween. In some embodiments, the mixing vessel can have a scale from about 1 kg/hour to about 10,000 kg/hour, 5 kg/hour to about 4,000 kg/hour, 10 kg/hour to about 3,000 kg/hour, 15 kg/hour to about 2,900 kg/hour, 20 kg/hour to about 2,800 kg/hour, 25 kg/hour to about 2,700 kg/hour, 30 kg/hour to about 2,600 kg/hour, 35 kg/hour to about 2,500 kg/hour, 40 kg/hour to about 2,400 kg/hour, 45 kg/hour to about 2,300 kg/hour, 50 kg/hour to about 2,200 kg/hour, 55 kg/hour to about 2,100 kg/hour, 60 kg/hour to about 2,000 kg/hour, 65 kg/hour to about 1,900 kg/hour, 70 kg/hour to about 1,800 kg/hour, 75 kg/hour to about 1,700 kg/hour, 80 kg/hour to about 1,600 kg/hour, 85 kg/hour to about 1,500 kg/hour, 90 kg/hour to about 1,400 kg/hour, 95 kg/hour to about 1,300 kg/hour, 100 kg/hour to about 1,200 kg/hour, 105 kg/hour to about 1,100 kg/hour, 110 kg/hour to about 1,000 kg/hour, 115 kg/hour to about 950 kg/hour, 120 kg/hour to about 900 kg/hour, 125 kg/hour to about 850 kg/hour, 130 kg/hour to about 800 kg/hour, 135 kg/hour to about 750 kg/hour, 140 kg/hour to about 700 kg/hour, 150 kg/hour to about 650 kg/hour, 155 kg/hour to about 600 kg/hour, or 160 kg/hour to about 500 kg/hour, inclusive of all values and ranges therebetween. In some embodiments, the linear length of extrusion can be from about 0.5 m to about 100 m, about 1 m to about 95 m, about 1.5 m to about 90 m, about 2 m to about 85 m, about 2.5 m to about 80 m, about 3 m to about 75 m, about 3.5 m to about 70 m, about 4 m to about 65 m, about 5 m to about 60 m, about 6 m to about 55 m, about 7 m to about 50 m, about 8 m to about 45 m, about 9 m to about 40 m, about 10 m to about 35 m, about 1 m to about 100 m, about 5 m to about 100 m, about 10 m to about 100 m, about 15 m to about 100 m, about 20 m to about 100 m, about 25 m to about 100 m, about 30 m to about 100 m, about 35 m to about 100 m, about 40 m to about 100 m, about 45 m to about 100 m, about 50 m to about 100 m, about 0.5 m to about 90 m, about 0.5 m to about 85 m, about 0.5 m to about 85 m, about 0.5 m to about 80 m, about 0.5 m to about 75 m, about 0.5 m to about 70 m, about 0.5 m to about 65 m, about 0.5 m to about 60 m, about 0.5 m to about 55 m, about 0.5 m to about 50 m, about 0.5 m to about 45 m, about 0.5 m to about 40 m, about 0.5 m to about 35 m, about 0.5 m to about 30 m, about 0.5 m to about 25 m, about 0.5 m to about 20 m, about 0.5 m to about 15 m, about 0.5 m to about 10 m, about 0.5 m to about 5 m, or about 0.5 m to about 1 m, inclusive of all values and ranges therebetween. In some embodiments, the extruder diameter can be between about 0.01 m to about 20 m, about 0.1 m to about 19 m, about 0.2 m to about 18 m, about 0.3 m to about 17 m, about 0.4 m to about 16 m, about 0.5 m to about 15 m, about 0.6 m to about 14 m, about 0.7 m to about 13 m, about 0.8 m to about 12 m, about 0.9 m to about 11 m, about 1 m to about 10 m, about 1.1 m to about 9 m, about 1.2 m to about 8 m, about 1.3 m to about 7 m, about 1.4 m to about 6 m, about 1.5 m to about 1.6 m to about 5 m, about 1.7 m to about 4 m, about 1.8 m to about 3 m, about 0.01 m to about 25 m, about 0.01 m to about 20 m, about 0.01 m to about 15 m, about 0.01 m to about 10 m, about 0.01 m to about 9 m, about 0.01 m to about 8 m, about 0.01 m to about 7 m, about 0.01 m to about 6 m, about 0.01 m to about 5 m, about 0.01 m to about 4 m, about 0.01 m to about 3 m, about 0.01 m to about 2 m, or about 0.01 m to about 1 m, inclusive of all values and ranges therebetween. In some embodiments, the screw diameter can be between about 0.01 m to about 20 m, about 0.1 m to about 19 m, about 0.2 m to about 18 m, about 0.3 m to about 17 m, about 0.4 m to about 16 m, about 0.5 m to about 15 m, about 0.6 m to about 14 m, about 0.7 m to about 13 m, about 0.8 m to about 12 m, about 0.9 m to about 11 m, about 1 m to about 10 m, about 1.1 m to about 9 m, about 1.2 m to about 8 m, about 1.3 m to about 7 m, about 1.4 m to about 6 m, about 1.5 m to about 1.6 m to about 5 m, about 1.7 m to about 4 m, about 1.8 m to about 3 m, about 0.01 m to about 25 m, about 0.01 m to about 20 m, about 0.01 m to about 15 m, about 0.01 m to about 10 m, about 0.01 m to about 9 m, about 0.01 m to about 8 m, about 0.01 m to about 7 m, about 0.01 m to about 6 m, about 0.01 m to about 5 m, about 0.01 m to about 4 m, about 0.01 m to about 3 m, about 0.01 m to about 2 m, or about 0.01 m to about 1 m, inclusive of all values and ranges therebetween.

In some embodiments, the first time period can be any non-zero time period, including but not limited to about 0.0001 seconds to about 1 hour, about 1 second to about 50 minutes, about 5 seconds to about 45 minutes, about 10 seconds to about 40 minutes, about 15 seconds to about 35 minutes, about 20 seconds to about 30 minutes, about 25 seconds to about 25 minutes, about 30 seconds to about 20 minutes, about 35 seconds to about 19 minutes, about 40 seconds to about 18 minutes, about 45 seconds to about 17 minutes, about 50 seconds to about 16 minutes, about 55 seconds to about 15 minutes, about 1 minute to about 14 minutes, about 2 minutes to about 13 minutes, about 3 minutes to about 12 minutes, about 4 minutes to about 11 minutes, about 5 minutes to about 10 minutes, about 0.0001 seconds to about 55 minutes, about 0.0001 seconds to about 50 minutes, about 0.0001 seconds to about 45 minutes, about 0.0001 seconds to about 40 minutes, about 0.0001 seconds to about 35 minutes, about 0.0001 seconds to about 30 minutes, about 0.0001 seconds to about 25 minutes, about 0.0001 seconds to about 20 minutes, about 0.0001 seconds to about 19 minutes, about 0.0001 seconds to about 18 minutes, about 0.0001 seconds to about 17 minutes, about 0.0001 seconds to about 16 minutes, about 0.0001 seconds to about 15 minutes, about 0.0001 seconds to about 14 minutes, about 0.0001 seconds to about 13 minutes, about 0.0001 seconds to about 12 minutes, about 0.0001 seconds to about 11 minutes, about 0.0001 seconds to about 10 minutes, about 0.0001 seconds to about 9 minutes, about 0.0001 seconds to about 8 minutes, about 0.0001 seconds to about 7 minutes, about 0.0001 seconds to about 6 minutes, about 0.0001 seconds to about 5 minutes, about 0.0001 seconds to about 4 minutes, about 0.0001 seconds to about 3 minutes, about 0.0001 seconds to about 2 minutes, about 0.0001 seconds to about 1 minute, about 0.0001 seconds to about 45 seconds, about 0.0001 seconds to about 30 seconds, about 0.0001 seconds to about 25 seconds, about 0.0001 seconds to about 10 seconds, about 0.0001 seconds to about 1 seconds, about 1 second to about 1 hour, about 10 seconds to about 1 hour, about 15 seconds to about 1 hour, about 30 seconds to about 1 hour, about 45 seconds to about 1 hour, about 1 minute to about 1 hour, about 2 minutes to about 1 hour, about 3 minutes to about 1 hour, about 4 minutes to about 1 hour, about 5 minutes to about 1 hour, about 6 minutes to about 1 hour, about 7 minutes to about 1 hour, about 8 minutes to about 1 hour, about 9 minutes to about 1 hour, about 10 minutes to about 1 hour, about 11 minutes to about 1 hour, about 12 minutes to about 1 hour, about 13 minutes to about 1 hour, about 15 minutes to about 1 hour, about 16 minutes to about 1 hour, about 17 minutes to about 1 hour, about 18 minutes to about 1 hour, about 19 minutes to about 1 hour, about 20 minutes to about 1 hour, about 25 minutes to about 1 hour, about 30 minutes to about 1 hour, about 35 minutes to about 1 hour, about 40 minutes to about 1 hour, about 45 minutes to about 1 hour, about 50 minutes to about 1 hour, or about 55 minutes to about 1 hour, inclusive of all values and ranges therebetween. In some embodiments, the first time period can be greater than or equal to zero seconds, about 0.0001 seconds, about 0.01 seconds, about 0.1 seconds, about 0.5 seconds, about 1 second, about 10 seconds, about 15 seconds, about 30 seconds, about 45 seconds, about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 25 minutes, about 30 minutes, about 35 minutes, about 45 minute, about 50 minutes, about 55 minutes, or greater than about 1 hour, inclusive of all values and ranges therebetween. In some embodiments, the first time period can be less than or equal to about 1 hour, about 55 minutes, about 50 minutes, about 45 minutes, about 40 minutes, about 35 minutes, about 30 minutes, about 25 minutes, about 20 minutes, about 19 minutes, about 18 minutes, about 17 minutes, about 16 minutes, about 15 minutes, about 14 minutes, about 13 minutes, about 12 minutes, about 11 minutes, about 10 minutes, about 9 minutes, about 8 minutes, about 7 minutes, about 6 minutes, about 5 minutes, about 4 minutes, about 3 minutes, about 2 minutes, about 1 minute, about 45 seconds, about 30 seconds, about 15 seconds, about 10 seconds, about 5 seconds, about 1 second, about 0.1 second, about 0.001 second, or about 0.0001 second, inclusive of all values and ranges therebetween.

In some embodiments, a system for manufacturing the master batch can include two or more mixing vessels operated in parallel or in series. In some embodiments, the graphitic material and polymer admixture can be transferred from a hopper or other suitably configured storage vessel into the mixing vessel. In some embodiments, the mixing vessel can be configured to heat the admixture to above the melting point of the polymer. In some embodiments, the mixing vessel can include a charging port configured to transfer fluids into the mixing vessel.

In some embodiments, mixing the graphitic material and the polymer (e.g., melt mixing) may cause the reduction of average graphene layers in the graphitic material down to between 1 layer and about 100 layers, between about 2 layers and about 95 layers, between about 3 layers and about 90 layers, between about 4 layers and about 85 layers, between 1 layer and about 35 layers, between 1 layer and about 30 layers, between 1 layer and about 25 layers, between 1 layer and about 20 layers, between 1 layer and about 19 layers, between 1 layer and about 18 layers, between 1 layer and about 17 layers, between 1 layer and about 16 layers, between 1 layer and about 15 layers, between 1 layer and about 14 layers, between 1 layer and about 13 layers, between 1 layer and about 12 layers, between 1 layer and about 11 layers, between 1 layer and about 10 layers, between 1 layer and about 9 layers, between 1 layer and about 8 layers, between 1 layer and about 7 layers, between 1 layer and about 6 layers, between 1 layer and about 5 layers, between 1 layer and about 4 layers, between 1 and about 3 layers, between 1 and about 2 layers, inclusive of all values and ranges therebetween.

The method 10 further includes transferring a supercritical fluid to the first mixture to form a second mixture 12. In some embodiments, the supercritical fluid can be transferred into the mixing vessel at the same time as the admixture, after the admixture is added but before the temperature rises enough to begin melting the polymer, during the melting of the polymer, after the polymer has fully melted, or at any other suitable point during the manufacturing process.

In some embodiments, the supercritical fluid can be added to the mixing vessel at substantially the same time as the polymer and/or the graphitic material. In some embodiments, the supercritical fluid can be added to the mixing vessel through one or more charging ports in the mixing vessel. In some embodiments, the supercritical fluid can include two or more materials.

In some embodiments, the supercritical fluid can be a first supercritical fluid and a second supercritical fluid can be added during the transferring 12 step or at another time during the method 10. In some embodiments, the second supercritical fluid can be the same supercritical fluid as the first supercritical fluid. In some embodiments, the second supercritical fluid can be added to maintain the pressure within the mixing vessel above the critical pressure of the first supercritical fluid. In some embodiments, the second supercritical fluid can be added to maintain the temperature within the mixing vessel above the critical temperature of the first supercritical fluid.

In some embodiments, the supercritical fluid can include but is not limited to carbon dioxide, nitrogen, xenon, ethane, hydrogen, water, methylene chloride, hexane, methane, ethylene, propylene, methanol, ethanol, acetone, nitrous oxide, or combinations thereof. By way of example only, if the supercritical fluid is carbon dioxide, then the temperature within the mixing vessel would greater than or equal to 31.1° C. (304.25 K) and the pressure within the mixing vessel would be greater than or equal to 7.39 MPa (1,071 psi). By way of example only, if the supercritical fluid is nitrogen, then the temperature within the mixing vessel would greater than or equal to −147° C. (126.2 K) and the pressure within the mixing vessel would be greater than or equal to 3.4 MPa (493.128 psi). These materials can be caused to become supercritical fluids by any suitable method. For example, the material can be charged into the sealed mixing vessel until the pressure within the mixing vessel reaches the critical pressure and the mixing vessel can be heated until the material reaches the critical temperature. In some embodiments, material can be caused to transition from a gas into a supercritical fluid in a separate container by any suitable method, including heating and/or volume reduction, heating and/or sufficient mass transfer into the separate container, etc. In some embodiments, the supercritical fluid can be a material classified as a permanent gas, meaning that the transition to a supercritical fluid can be accomplished by changing only one of the pressure or the temperature within the mixing vessel or separate container.

In some embodiments, the mixing vessel can be pressurized to between about 10 psi and about 7,000 psi, about 14 psi and about 6,500 psi, about 15 psi and about 6,200 psi, about 16 psi and about 6,100 psi, about 17 psi and about 6,000 psi, about 18 psi and about 5,900 psi, about 19 psi and about 5,800 psi, about 20 psi and about 5,700 psi, about 25 psi and about 5,600 psi, about 30 psi and about 5,500 psi, about 35 psi and about 5,400 psi, about 40 psi and about 5,300 psi, about 45 psi and about 5,200 psi, about 50 psi and about 5,100 psi, about 75 psi and about 5,000 psi, about 100 psi and about 4,900 psi, about 150 psi and about 4,800 psi, about 200 psi and about 4,700 psi, about 300 psi and about 4,600 psi, about 400 psi and about 4,500 psi, about 500 psi and about 4,400 psi, about 600 psi and about 4,300 psi, about 700 psi and about 4,200 psi, about 800 psi and about 4,100 psi, about 900 psi and about 4,000 psi, about 1,000 psi and about 7,000 psi, about 1,000 psi and about 6,000 psi, about 1,000 psi and about 5,000 psi, about 1,000 psi and about 4,500 psi, about 1,000 psi and about 4,000 psi, about 10 psi and about 6,500 psi, about 10 psi and about 6,000 psi, about 10 psi and about 5,500 psi, about 10 psi and about 5,000 psi, about 10 psi and about 4,500 psi, about 10 psi and about 4,000 psi, about 10 psi and about 3,500 psi, about 10 psi and about 3,000 psi, about 10 psi and about 2,500 psi, about 10 psi and about 2,000 psi, about 10 psi and about 1,500 psi, about 10 psi and about 1,000 psi, about 10 psi and about 750 psi, about 10 psi and about 500 psi, about 10 psi and about 250 psi, about 25 psi and about 7,000 psi, about 50 psi and about 7,000 psi, about 75 psi and about 7,000 psi, about 100 psi and about 7,000 psi, about 250 psi and about 7,000 psi, about 500 psi and about 7,000 psi, about 750 psi and about 7,000 psi, about 1,000 psi and about 7,000 psi, about 1,250 psi and about 7,000 psi, about 1,500 psi and about 7,000 psi, about 1,750 psi and about 7,000 psi, about 2,000 psi and about 7,000 psi, about 2,250 psi and about 7,000 psi, about 2,500 psi and about 7,000 psi, about 2,750 psi and about 7,000 psi, about 3,000 psi and about 7,000 psi, about 3,250 psi and about 7,000 psi, about 3,500 psi and about 7,000 psi, about 3,750 psi and about 7,000 psi, about 4,000 psi and about 7,000 psi, about 4,500 psi and about 7,000 psi, about 5,000 psi and about 7,000 psi, about 5,500 psi and about 7,000 psi, or about 6,000 psi and about 7,000 psi, inclusive of all values and ranges therebetween. In some embodiments, the mixing vessel can be pressurized to greater than about 10 psi, 25 psi, 50 psi, 75 psi, 100 psi, 250 psi, 500 psi, 750 psi, 1,000 psi, 1,500 psi, 2,000 psi, 2,500 psi, 3,000 psi, 3,500 psi, 4,000 psi, 4,500 psi, 5,000 psi, 5,500 psi, 6,000 psi, 6,500 psi, or greater than about 7,000 psi, inclusive of all values and ranges therebetween.

In some embodiments, the amount of supercritical fluid added to the mixing vessel can be between about 0.0001 wt % and about 15 wt % of the polymer/graphitic material mixture in the mixing vessel. In some embodiments, the amount of supercritical fluid can be between about 0.001 wt % and about 14 wt %, about 0.01 wt % and about 13 wt %, about 0.1 wt % and about 12 wt %, about 1 wt % and about 11 wt %, about 1.5 wt % and about 10 wt %, about 2 wt % and about 9 wt %, about 2.5 wt % and about 8 wt %, about 3 wt % and about 7 wt %, about 3.5 wt % and about 6 wt %, about 4 wt % and about 5 wt %, about 0.001 wt % and about 15 wt %, about 0.01 wt % and about 15 wt %, about 0.1 wt % and about 15 wt %, about 1 wt % and about 15 wt %, about 2 wt % and about 15 wt %, about 3 wt % and about 15 wt %, about 4 wt % and about 15 wt %, about 5 wt % and about 15 wt %, about 6 wt % and about 15 wt %, about 7 wt % and about 15 wt %, about 8 wt % and about 15 wt %, about 9 wt % and about 15 wt %, about 10 wt % and about 15 wt %, about 11 wt % and about 15 wt %, about 12 wt % and about 15 wt %, about 13 wt % and about 15 wt %, about 14 wt % and about 15 wt %, about 1 wt % and about 14 wt %, about 1 wt % and about 13 wt %, about 1 wt % and about 12 wt %, about 1 wt % and about 11 wt %, about 1 wt % and about 10 wt %, about 1 wt % and about 9 wt %, about 1 wt % and about 8 wt %, about 1 wt % and about 7 wt %, about 1 wt % and about 6 wt %, about 1 wt % and about 5 wt %, about 1 wt % and about 4 wt %, about 1 wt % and about 3 wt %, about 1 wt %, and about 2 wt %, about 3 wt % and about 5 wt %, or about 2 wt % and about 6 wt %, inclusive of all values and ranges therebetween. In some embodiments, the amount of supercritical fluid can be greater than about 0.0001 wt %, 0.001 wt %, about 0.01 wt %, about 0.1 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, inclusive of all values and ranges therebetween.

The method 10 further includes mixing the second mixture for a second period of time 13. In some embodiments, the second time period can include any of the values or ranges described herein with regard to the first time period. In some embodiments, the second time period can be substantially similar to the first time period. In some embodiments, the second time period can be longer than the first time period. In some embodiments, the first time period can be substantially all or most of the total mixing period such that exposure of the graphitic material/polymer mixture to the supercritical fluid occurs for only a short period (e.g., flash exposure).

In some embodiments, the pressure within the mixing vessel can be maintained at or above the critical pressure of the supercritical fluid during mixing 13 of the graphitic material/polymer/supercritical fluid mixture. In some embodiments, the temperature within the mixing vessel can be maintained at or above the critical temperature of the supercritical fluid during mixing 13 of the graphitic material/polymer/supercritical fluid mixture. In some embodiments, supercritical fluid can be added during the mixing 13 step in order to maintain the pressure in the mixing vessel above the critical pressure of the supercritical fluid. In some embodiments, further addition of the supercritical fluid may help maintain the temperature in the mixing vessel above the critical temperature of the supercritical fluid.

The method 10 further includes depressurizing the second mixture to allow the supercritical fluid to transition to a gas phase 16. In some embodiments, the depressurization step 16 can include a rapid expansion of supercritical solutions. Without wishing to be bound by any particular theory, depressurization of the supercritical fluid or supercritical solution may cause recrystallization of the polymer matrix, separation of graphitic material particles/platelets, and/or further exfoliation of the graphitic material. In some embodiments, the supercritical fluid can be mixed with a solvent such that the resulting admixture can be configured for use in a gas anti solvent process. In some embodiments, the gas anti solvent process can cause the recrystallization, crosslinking, or intercalation of the polymer to form a polymer matrix with the graphitic material substantially dispersed in the polymer matrix. In some embodiments, the mixture can be exposed to the supercritical fluid and then depressurized repeatedly until a desired final composition is achieved.

In some embodiments, the rate of depressurization can be about 1 psi/minute to about 1,000 psi/second, about 10 psi/minute to about 900 psi/second, about 50 psi/minute to about 800 psi/second, about 100 psi/minute to about 700 psi/second, about 150 psi/minute to about 600 psi/second, about 200 psi/minute to about 500 psi/second, about 250 psi/minute to about 400 psi/second, about 300 psi/minute to about 300 psi/second, about 300 psi/minute to about 200 psi/second, about 350 psi/minute to about 150 psi/second, about 400 psi/minute to about 100 psi/second, about 450 psi/minute to about 50 psi/second, about 500 psi/minute to about 25 psi/second, about 550 psi/minute to about 1,250 psi/minute, about 600 psi/minute to about 1,000 psi/minute, about 650 psi/minute to about 950 psi/minute, about 1 psi/minute to about 950 psi/second, about 1 psi/minute to about 900 psi/second, about 1 psi/minute to about 850 psi/second, about 1 psi/minute to about 800 psi/second, about 1 psi/minute to about 750 psi/second, about 1 psi/minute to about 700 psi/second, about 1 psi/minute to about 650 psi/second, about 1 psi/minute to about 600 psi/second, about 1 psi/minute to about 550 psi/second, about 1 psi/minute to about 500 psi/second, about 1 psi/minute to about 450 psi/second, about 1 psi/minute to about 400 psi/second, about 1 psi/minute to about 350 psi/second, about 1 psi/minute to about 300 psi/second, about 1 psi/minute to about 250 psi/second, about 1 psi/minute to about 200 psi/second, about 1 psi/minute to about 150 psi/second, about 1 psi/minute to about 125 psi/second, about 1 psi/minute to about 125 psi/second, about 1 psi/minute to about 50 psi/second, about 1 psi/minute to about 1,250 psi/minute, about 1 psi/minute to about 1,000 psi/minute, about 1 psi/minute to about 950 psi/minute, about 1 psi/minute to about 900 psi/minute, about 1 psi/minute to about 850 psi/minute, about 1 psi/minute to about 800 psi/minute, about 1 psi/minute to about 750 psi/minute, about 1 psi/minute to about 700 psi/minute, about 1 psi/minute to about 650 psi/minute, about 1 psi/minute to about 600 psi/minute, about 1 psi/minute to about 550 psi/minute, about 1 psi/minute to about 500 psi/minute, about 1 psi/minute to about 450 psi/minute, about 1 psi/minute to about 400 psi/minute, about 1 psi/minute to about 350 psi/minute, about 1 psi/minute to about 300 psi/minute, about 1 psi/minute to about 250 psi/minute, about 1 psi/minute to about 200 psi/minute, about 1 psi/minute to about 150 psi/minute, about 1 psi/minute to about 100 psi/minute, about 1 psi/minute to about 75 psi/minute, about 1 psi/minute to about 50 psi/minute, about 1 psi/minute to about 25 psi/minute, about 1 psi/minute to about 10 psi/minute, about 1 psi/minute to about 5 psi/minute, about 5 psi/minute to about 1,000 psi/second, about 10 psi/minute to about 1,000 psi/second, about 15 psi/minute to about 1,000 psi/second, about 25 psi/minute to about 1,000 psi/second, about 50 psi/minute to about 1,000 psi/second, about 75 psi/minute to about 1,000 psi/second, about 100 psi/minute to about 1,000 psi/second, about 125 psi/minute to about 1,000 psi/second, about 150 psi/minute to about 1,000 psi/second, about 200 psi/minute to about 1,000 psi/second, about 300 psi/minute to about 1,000 psi/second, about 400 psi/minute to about 1,000 psi/second, about 500 psi/minute to about 1,000 psi/second, about 600 psi/minute to about 1,000 psi/second, about 700 psi/minute to about 1,000 psi/second, about 800 psi/minute to about 1,000 psi/second, about 900 psi/minute to about 1,000 psi/second, about 1,000 psi/minute to about 1,000 psi/second, about 1,250 psi/minute to about 1,000 psi/second, about 50 psi/second to about 1,000 psi/second, about 100 psi/second to about 1,000 psi/second, about 150 psi/second to about 1,000 psi/second, about 200 psi/second to about 1,000 psi/second, about 300 psi/second to about 1,000 psi/second, about 400 psi/second to about 1,000 psi/second, about 500 psi/second to about 1,000 psi/second, about 600 psi/second to about 1,000 psi/second, about 700 psi/second to about 1,000 psi/second, about 800 psi/second to about 1,000 psi/second, or about 900 psi/second to about 1,000 psi/second, inclusive of all values and ranges therebetween. In some embodiments, depressurization 16 can include a relatively more metered, intermittent, continuous, and/or otherwise slower depressurization. In some embodiments, depressurization can be carried out for greater than about 1 minute, about 55 seconds, about 50 seconds, about 45 seconds, about 40 seconds, about 35 seconds, about 30 seconds, about 25 seconds, about 20 seconds, about 15 seconds, about 10 seconds, about 5 seconds, about 4 seconds, about 3 seconds, about 2 seconds, or about 1 second, inclusive of all values and ranges therebetween. Without wishing to be bound by any particular theory, depending on the polymer used and the rate of depressurization, the rapid depressurization of the supercritical fluid or supercritical solution may cause some amount of disruption to the polymer matrix.

In some embodiments, depressurization may cause the reduction of average graphene layers in the graphitic material down to between 1 layer and about 100 layers, between 1 layer and about 50 layers, between 1 layer and about 45 layers, between 1 layer and about 40 layers, between 1 layer and about 35 layers, between 1 layer and about 30 layers, between 1 layer and about 25 layers, between 1 layer and about 20 layers, between 1 layer and about 19 layers, between 1 layer and about 18 layers, between 1 layer and about 17 layers, between 1 layer and about 16 layers, between 1 layer and about 15 layers, between 1 layer and about 14 layers, between 1 layer and about 13 layers, between 1 layer and about 12 layers, between 1 layer and about 11 layers, between 1 layer and about 10 layers, between 1 layer and about 9 layers, between 1 layer and about 8 layers, between 1 layer and about 7 layers, between 1 layer and about 6 layers, between 1 layer and about 5 layers, between 1 layer and about 4 layers, between 1 and about 3 layers, between 1 and about 2 layers, inclusive of all values and ranges therebetween.

In some embodiments, the finished mixture of graphitic material and polymer can include between about 0.0001 wt % to about 45 wt % graphitic material, about 0.001 wt % and about 44 wt %, about 0.01 wt % and about 43 wt %, about 0.1 wt % and about 42 wt %, about 1 wt % and about 41 wt %, about 1 wt % and about 40 wt %, about 1 wt % and about 39 wt %, about 1 wt % and about 38 wt %, about 1 wt % and about 37 wt %, about 1 wt % and about 36 wt %, about 1 wt % and about 35 wt %, about 1 wt % and about 34 wt %, about 1 wt % and about 33 wt %, about 1 wt % and about 32 wt %, about 1 wt % and about 31 wt %, about 1 wt % and about 30 wt %, about 1 wt % and about 29 wt %, about 1 wt % and about 28 wt %, about 1 wt % and about 27 wt %, about 1 wt % and about 26 wt %, about 1 wt % and about 25 wt %, about 1 wt % and about 24 wt %, about 1 wt % and about 23 wt %, about 1 wt % and about 22 wt %, about 1 wt % and about 21 wt %, about 1 wt % and about 20 wt %, about 1 wt % and about 19 wt %, about 1 wt % and about 18 wt %, about 1 wt % and about 17 wt %, about 1 wt % and about 16 wt %, about 1 wt % and about 15 wt %, about 1 wt % and about 14 wt %, about 1 wt % and about 13 wt %, about 1 wt % and about 12 wt %, about 1 wt % and about 11 wt %, about 1 wt % and about 10 wt %, about 1 wt % and about 9 wt %, about 1 wt % and about 8 wt %, about 1 wt % and about 7 wt %, about 1 wt % and about 6 wt %, about 1 wt % and about 5 wt %, about 1 wt % and about 4 wt %, about 1 wt % and about 3 wt %, about 1 wt % and about 2 wt %, about 2 wt % and about 45 wt %, about 3 wt % and about 45 wt %, about 4 wt % and about 45 wt %, about 5 wt % and about 45 wt %, about 6 wt % and about 45 wt %, about 7 wt % and about 45 wt %, about 8 wt % and about 45 wt %, about 9 wt % and about 45 wt %, about 10 wt % and about 45 wt %, about 11 wt % and about 45 wt %, about 12 wt % and about 45 wt %, about 13 wt % and about 45 wt %, about 14 wt % and about 45 wt %, about 15 wt % and about 45 wt %, about 16 wt % and about 45 wt %, about 17 wt % and about 45 wt %, about 18 wt % and about 45 wt %, about 19 wt % and about 45 wt %, about 20 wt % and about 45 wt %, about 21 wt % and about 45 wt %, about 22 wt % and about 45 wt %, about 23 wt % and about 45 wt %, about 24 wt % and about 45 wt %, about 25 wt % and about 45 wt %, about 26 wt % and about 45 wt %, about 27 wt % and about 45 wt %, about 28 wt % and about 45 wt %, about 29 wt % and about 45 wt %, about 30 wt % and about 45 wt %, about 2 wt % and about 5 wt %, about 2 wt % and about 10 wt %, about 2 wt % and about 15 wt %, about 2 wt % and about 20 wt %, about 2 wt % and about 25 wt %, about 2 wt % and about 30 wt %, about 2 wt % and about 35 wt %, about 2 wt % and about 40 wt %, or about 2 wt % and about 45 wt %, inclusive of all values and ranges therebetween. In some embodiments, the finished mixture of graphitic material and polymer can be greater than about 0.0001 wt %, about 0.001 wt %, about 0.01 wt %, about 0.1 wt %, about 0.1 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 35 wt %, about 36 wt %, about 37 wt %, about 38 wt %, about 39 wt %, about 40 wt %, about 41 wt %, about 42 wt %, about 43 wt %, about 44 wt %, or greater than about 45 wt %, inclusive of all values and ranges therebetween.

Figure 2:
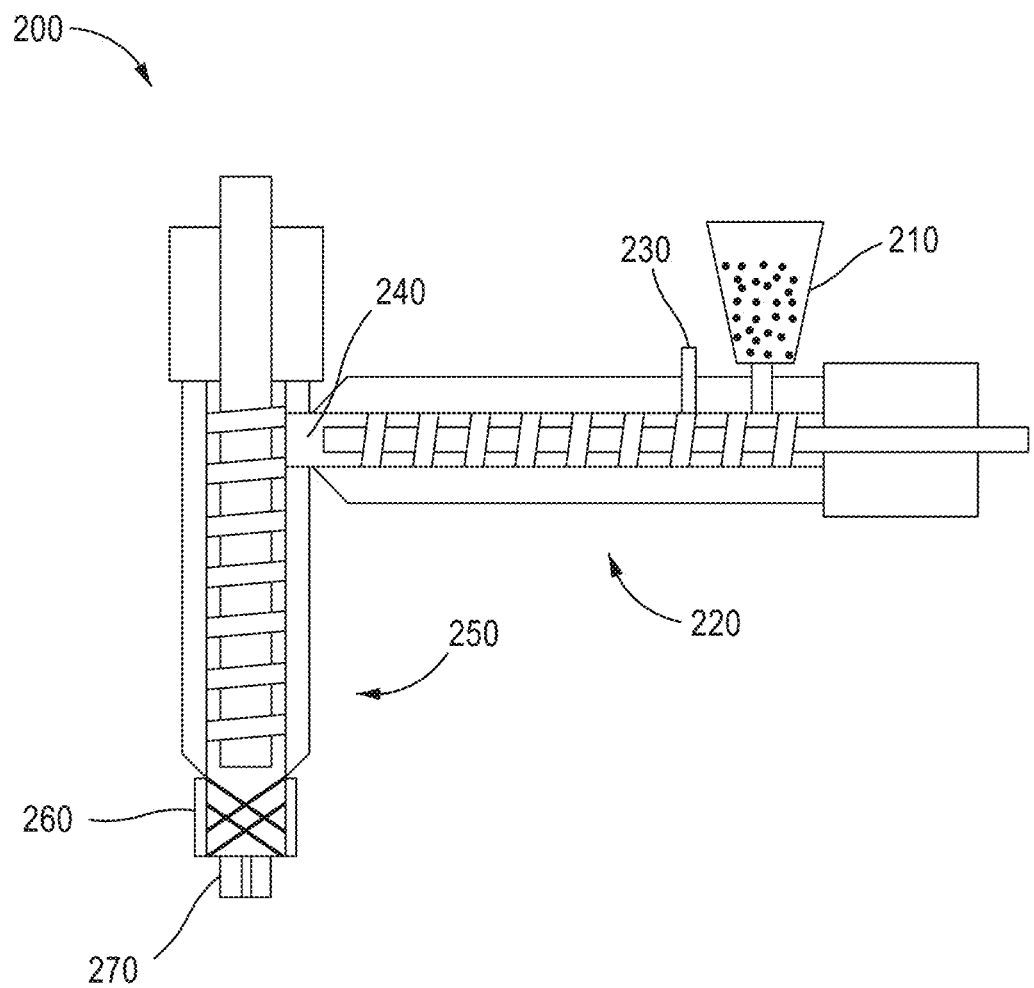
FIG. 2 is a schematic illustration of a system for manufacturing a master batch with graphene dispersed in a polymer matrix, according to an embodiment.

FIG. 2 illustrates a system 200 for manufacturing a master batch of the polymer (e.g., pellets) including the graphitic material dispersed in the polymer. In some embodiments, the system 200 can include a reservoir 210 configured to contain a supply of at least one of the polymer or the graphitic material. In some embodiments, the reservoir 210 can be coupled to a primary mixing device 220 configured to heat and/or communicate a material along a flow path. In some embodiments, a solid mixture of the polymer and the graphitic material can be transferred from the reservoir 210 into the primary mixing device 220 at intervals or continuously. In some embodiments, the primary mixing device 220 can include any of the mixing devices described above with regard to the method 10. In some embodiments, the primary mixing device 220 can be heated such that the polymer may become fully melted between the reservoir 210 and a terminal end (not shown) of the primary mixing device 220. In some embodiments, the polymer can be fully melted and the graphitic material can be fully dispersed in the polymer once the mixture reaches the terminal end, forming the finished mixture 240.

In some embodiments, the primary mixing device 220 can include an aperture defining a charging port 230 configured to communicate the supercritical fluid into the primary mixing device 220. In some embodiments, the charging port 230 can be positioned nearby the beginning of the flow path such that the supercritical fluid is charged into the primary mixing device 220 at substantially the same time as the polymer and the graphitic material. In some embodiments, the charging port 230 can be positioned further along the flow path such that the polymer is partially or fully melted and the graphitic material is partially or fully dispersed in the polymer before the supercritical fluid is charged into the primary mixing device 220.

In some embodiments, the system 200 can further include a secondary mixing device 250 configured to be coupled to the primary mixing device 220 at the terminal end 240. In some embodiments, the secondary mixing device 250 can include any of the mixing devices described above with regard to the method 10. In some embodiments, the secondary mixing device 250 can be configured such that the supercritical fluid can be depressurized during mixing. In some embodiments, the supercritical fluid can be depressurized when the mixture of the polymer, the graphitic material, and the supercritical fluid is communicated from the primary mixing device 220 into the secondary mixing device 250.

In some embodiments, the secondary mixing device 250 can include a static mixer 260 at a distal end of the secondary mixing device 250. In some embodiments, the static mixer 260 can be configured to fully homogenize the polymer and the graphitic material mixture. In some embodiments, the secondary mixing device 250 can further include a die 270 coupled to the static mixer 260. In some embodiments, the die 270 can be configured to form the mixture of the polymer and the graphitic material into a solidified form factor. In some embodiments, the die 270 can be configured to force the plastic and graphitic material mixture into a mold. In some embodiments, the die 270 can be configured to cool the fluid mixture of plastic such that the graphitic material is substantially fixed in a dispersed state within the polymer matrix.

Figure 3:
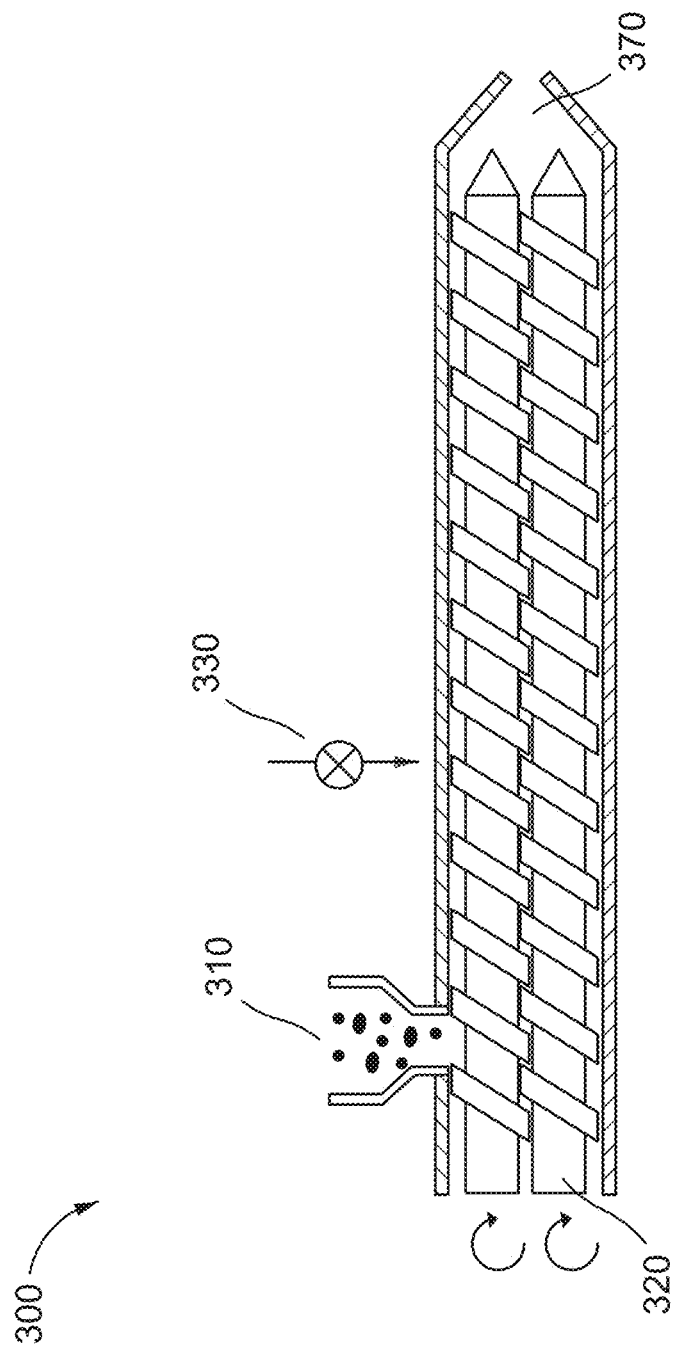
FIG. 3 is a schematic illustration of a system for manufacturing a master batch with graphene dispersed in a polymer matrix, according to an embodiment.

FIG. 3 illustrates a system 300 for manufacturing a master batch of the polymer (e.g., pellets) including the graphitic material dispersed in the polymer. In some embodiments, the system 300 can include a reservoir 310 configured to charge a metered amount of the polymer and/or the graphitic material into a mixing device 320. As shown in FIG. 3, the mixing device 320 can include a co-rotating twin screw extrusion device configured to heat the polymer to the point of at least partial melting. In some embodiments, the twin screw extrusion device can be configured to at least partially disperse the graphitic material in the polymer before, during, and/or after melting of the polymer. In some embodiments, the twin screws can be mounted on splined shafts in a closed barrel according to any suitable configuration. In some embodiments, the twin screw extrusion device can be configured to transform the polymeric material into an engineered polymeric matrix by controlling screw rotation, twin screw rotation direction, screw shape and materials chosen, distance between the screws, or other parameters.

In some embodiments, the mixing device 320 can include a heating element such as a thermocouple, heat wrapping, and/or a heat exchanger, the heating element configured to at least partially contribute to the melting of the polymer. Without wishing to be bound by any particular theory, the shear forces caused by the rotation of the twin screws may contribute to the melting of the polymer. Without wishing to be bound by any particular theory, the hydraulic forces and/or shear forces of mixing may contribute to some extent of exfoliation of the graphitic material during mixing of the polymer and the graphitic material.

In some embodiments, the system 300 can include a charging port 330 configured to transfer the supercritical fluid into the mixing device 320. In some embodiments, the charging port 330 can be positioned at any point along a polymer flow path defined by the mixing device 320. In some embodiments, the charging port 330 can include an aperture defined in an outer surface or insulating jacket of the mixing device 320. In some embodiments, a metering device and/or pump can be configured to transfer the supercritical fluid through the charging port 330 into the mixing device 320. In some embodiments, the charging port 330 can be configured to transfer the supercritical fluid substantially continuously, intermittently, or in a batch-wise manner. In some embodiments, the supercritical fluid can be mixed with a portion of the polymer or another material before being charged into the mixing device 320.

Without wishing to be bound by any particular theory, the transfer of supercritical fluid into the mixing device 320 may cause further melting of the polymer and/or homogenization of the polymer/graphitic material mixture. By way of example only, in some embodiments, the graphitic material can be graphene nanoplatelets and may be further exfoliated to become few layer graphene due to supercritical fluid introduction. By way of example only, in some embodiments, the graphitic material can be few layer graphene and may be further exfoliated to become single layer graphene due to supercritical fluid introduction.

In some embodiments, the system 300 can include a die 370 configured to receive the homogenized mixture of the polymer and transfer the mixture out of the mixing device 320. In some embodiments, the die 370 can be configured to form the mixture of the polymer and the graphitic material into a solidified form factor. In some embodiments, the die 370 can be configured to force the plastic and graphitic material mixture into a mold. In some embodiments, the die 370 can be configured to cool the fluid mixture of plastic such that the graphitic material is substantially fixed in a dispersed state within the polymer matrix.

FIGS. 4 and 5 illustrate a system 400 for manufacturing a master batch of the polymer (e.g., pellets) including the graphitic material dispersed in the polymer. In some embodiments, the system 400 can include a reservoir 410 configured to charge a metered amount of the polymer and/or the graphitic material into a mixing device 420. In some embodiments, the mixing device 420 can include an extruder or auger. In some embodiments, the mixing device 420 can be substantially similar to the mixing device 120, the mixing device 220, or the mixing device 320. In some embodiments, the mixing device 420 can be configured to heat the polymer to the point of at least partial melting. In some embodiments, the mixing device 420 can be configured to at least partially disperse the graphitic material in the polymer before, during, and/or after melting of the polymer.

In some embodiments, the mixing device 420 can include a heating element such as a thermocouple, heat wrapping, and/or a heat exchanger, the heating element configured to at least partially contribute to the melting of the polymer. Without wishing to be bound by any particular theory, the shear forces caused by the rotation of the twin screws may contribute to the melting of the polymer. Without wishing to be bound by any particular theory, the hydraulic forces and/or shear forces of mixing may contribute to some extent of exfoliation of the graphitic material during mixing of the polymer and the graphitic material.

In some embodiments, the system 400 can include a charging port 430 configured to transfer the supercritical fluid into the mixing device 420. In some embodiments, the charging port 430 can be positioned at any point along a polymer flow path defined by the mixing device 420. In some embodiments, the charging port 430 can include an aperture defined in an outer surface or insulating jacket of the mixing device 420. In some embodiments, a metering device and/or pump can be configured to transfer the supercritical fluid through the charging port 430 into the mixing device 420. In some embodiments, the charging port 430 can be configured to transfer the supercritical fluid substantially continuously, intermittently, or in a batch-wise manner. In some embodiments, the supercritical fluid can be mixed with a portion of the polymer or another material before being charged into the mixing device 420.

Without wishing to be bound by any particular theory, the transfer of supercritical fluid into the mixing device 420 may cause further melting of the polymer and/or homogenization of the polymer/graphitic material mixture to form a finished mixture 440. By way of example only, in some embodiments, the graphitic material can be graphene nanoplatelets and may be further exfoliated to become few layer graphene due to supercritical fluid introduction. By way of example only, in some embodiments, the graphitic material can be few layer graphene and may be further exfoliated to become single layer graphene due to supercritical fluid introduction.

In some embodiments, the system 400 can include a die 470 configured to receive the homogenized mixture of the polymer and transfer the mixture out of the mixing device 420. In some embodiments, the die 470 can be configured to form the mixture of the polymer and the graphitic material into a partially solidified form factor. In some embodiments, the finished mixture 440 can be charged into the die 470 in a batch-wise manner such that only a portion of the finished mixture 440 partially solidifies in the die 470. In some embodiments, the die 470 can be configured to force the plastic and graphitic material mixture into a mold. In some embodiments, the die 470 can be configured to cool the fluid mixture of plastic such that the graphitic material is substantially fixed in a dispersed state within the polymer matrix. In some embodiments, the die 470 can be a conduit or other suitable pass-through to a mold 480. In some embodiments, the mold can include a cavity 490 configured to define the extent of one or more articles to be molded by forcing the homogenous mixture of the polymer and the graphitic material into the mold 480. In some embodiments, a plurality of microstructures 492 may form in the finished mixture 440 upon injecting the finished mixture 440 into the cavity 490, as shown in FIG. 5. Without wishing to be bound by any particular theory, heating, cooling, compressing, and/or adding a material into the cavity may cause the formation of the microstructures 492 in the finished mixture 440. In some embodiments, the microstructures 492 can include bubbles, polymer matrix nuclei, or any other suitable structures.

Figure 6:
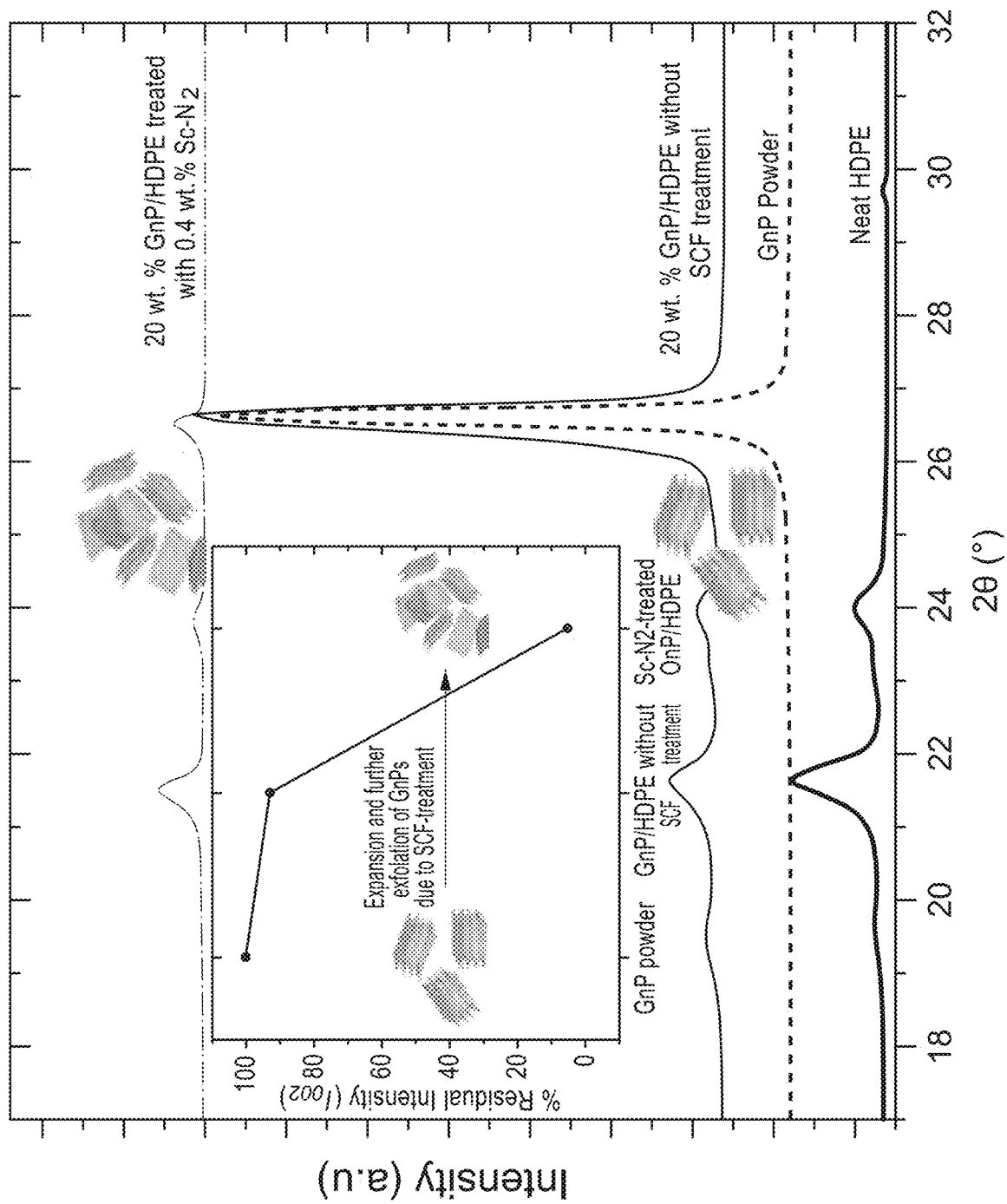
FIG. 6 is a diffractogram of graphene treated with Sc—$N_2$ using an injection molding technique, according to an embodiment.
Figure 7:
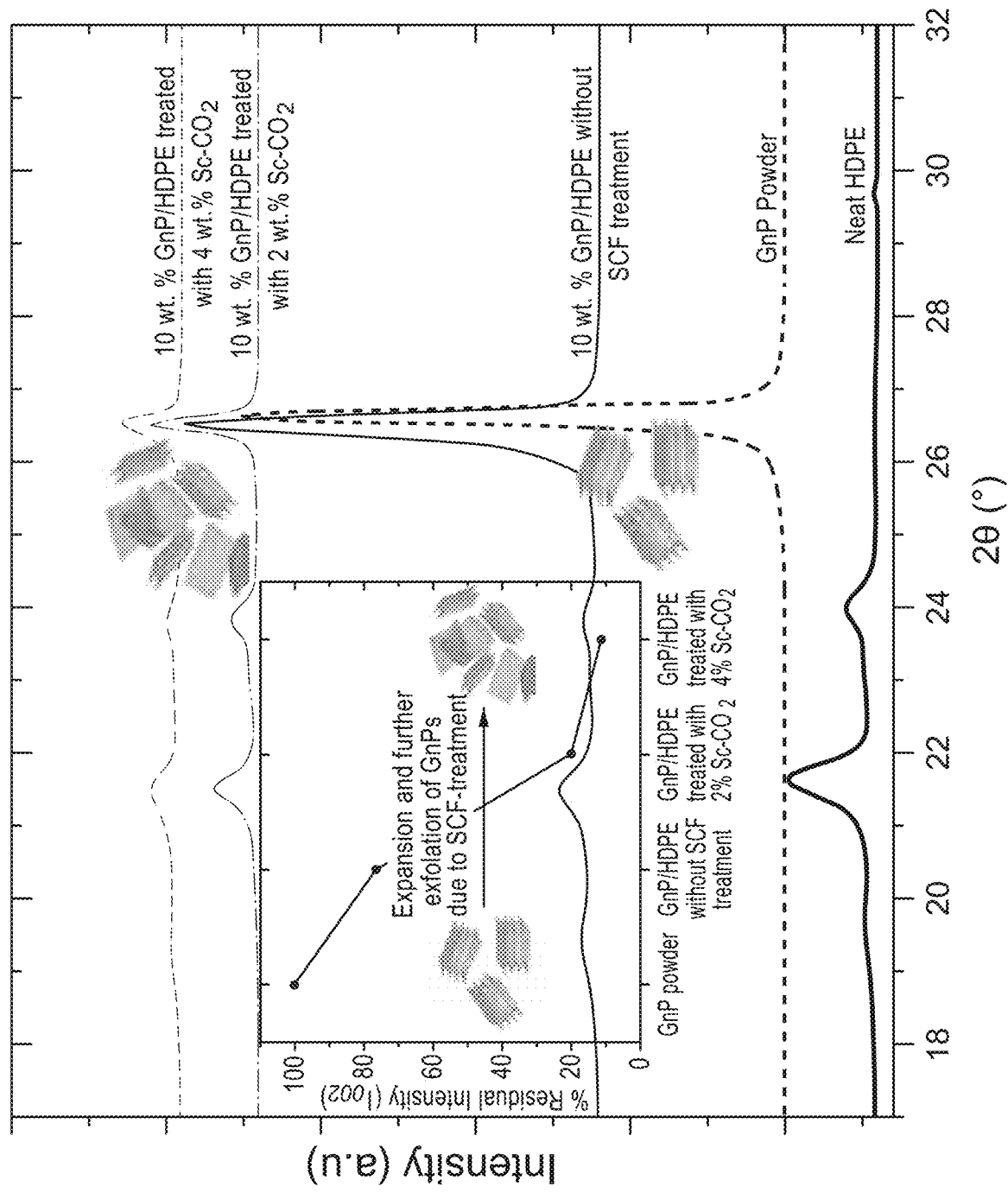
FIG. 7 is a diffractogram of graphene treated with Sc—$N_2$ using a tandem extruder technique, according to an embodiment.

FIGS. 6 and 7 are x-ray diffractograms showing wide-angle X-ray diffraction patterns of graphene nanoplatelet powder, graphene nanoplatelet/high-density polyethylene and supercritical fluid-treated graphene nanoplatelet/high-density polyethylene nanocomposites with 10 wt. % and 20 wt. % of graphene nanoplatelet using injection molding and tandem extrusion techniques, respectively. The diffraction peak at $2\theta=26.5°$, is characteristic of the 002 reflection of graphite (I002) resulting from the d-spacing between monolayer graphene sheets. The Sc—$N_2$ and Sc—$CO_2$ treatment of graphene nanoplatelet/high-density polyethylene respectively results in 94% and 86% decrease in the intensity of I002 diffraction of corresponding non-treated nanocomposites. This suggests the occurrence of efficient exfoliation and structural disordering of the graphene nanoplatelets. Although, there are still layered graphene nanoplatelet structure retained in each stage, explaining the presence of the slight diffraction (I002) even after supercritical fluid-treatment of the graphene nanoplatelet/high-density polyethylene nanocomposites. However, the I002 diffraction of supercritical fluid-treated graphene nanoplatelet/polymer nanocomposites is slightly shifted to lower angles indicating the d-spacing expansion of the layered structure of graphene nanoplatelets.

This technique can be conducted using several apparatuses such as extruder, twin screw compounder or injection molding, equipped with required instruments for injecting supercritical fluid (e.g., $CO_2$, $N_2$) to the graphene nanoplatelet-polymer mixture. After plasticizing and melting the graphene nanoplatelet-polymer mixture using the implemented apparatus, a predetermined amount of pressure is applied to the graphene nanoplatelet-polymer mixture. Subsequently, the supercritical fluid, at predetermined flow rate and pressure, is injected to the graphene nanoplatelet-polymer melt while shearing of a mixture is constantly applied throughout the process (e.g. extrusion or injection molding). After a sufficient period of time, the process is followed by rapid depressurizing of the graphene nanoplatelet-polymer-supercritical fluid mixture to substantially exfoliated and disperse graphene nanoplatelets in the polymer matrix. The depressurizing step can be extruding the mixture down to ambient conditions followed by de-gassing the product.

In some embodiments, the methods and systems described herein offer a scalable method of manufacturing graphene nanoplatelet-based nanocomposites having uniformly dispersed and highly exfoliated graphene nanoplatelets within the polymer. This supercritical fluid-assisted method, consolidates subsequent steps of (i): exfoliation of the graphitic material and (ii): dispersion of the graphitic material within the polymer, both in one step. This is greatly in favor of large-scale production of multifunctional graphitic material-based polymer nanocomposites with a reasonable cost. This also impacts the advancement and optimization of industry-scale processing of graphene nanoplatelet-based polymer nanocomposites with tailored properties which lead to their use in numerous applications such as electronic packaging, super-capacitors, electromagnetic interference shielding, and bipolar plates of fuel cells.

In some embodiments, the graphitic material/polymer powder or pellet obtained according to the present disclosure can be further mixed with other polymer powders or pellets as described above through mechanical mixing. In some embodiments, the graphitic material/polymer powder or pellets obtained according to the present disclosure or their mixture with other polymer powders or pellets can be further processed by extrusion to produce graphitic material/polymer composite filaments or pellets or formed articles with highly dispersed and uniformly distributed graphene nanoflakes in the polymer matrices. In some embodiments, the graphitic material/polymer powder or pellets obtained according to the present disclosure or their mixture with other polymer powders or pellets can be further processed by injection molding to produce formed articles with graphene nanoflakes highly dispersed and uniformly distributed in the polymer matrices. In some embodiments, the graphitic material/polymer powder or pellets obtained according to the present disclosure or their mixture with other polymer powders or pellets can be further processed by compression molding to produce formed articles with graphene nanoflakes highly dispersed and uniformly distributed in the polymer matrices.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. For example, the non-aqueous electrolyte can also include a gel polymer electrolyte. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of manufacturing a polymer master batch, the method comprising:
mixing a supercritical fluid and a composite material to form a mixture, the composite material including a graphitic material and a polymer; and
depressurizing the mixture to allow the supercritical fluid to transition to a gas phase thereby forming microstructures in the mixture,
wherein the graphitic material has a first average thickness in the composite material and a second average thickness in the mixture, the second average thickness less than the first average thickness.

2. The method of claim 1, wherein the microstructures are gas bubbles.

3. The method of claim 1, further comprising:
extruding the mixture down to ambient conditions.

4. The method of claim 1, further comprising:
extruding the mixture to form a plurality of pellets.

5. The method of claim 4, further comprising:
mixing the plurality of pellets and extruding to form a batch of pellets.

6. The method of claim 5, further comprising:
injection molding or compression molding the batch of pellets to produce formed articles.

7. The method of claim 1, wherein the graphitic material has layers and the supercritical fluid intercalates between the layers of the graphitic material.

8. The method of claim 7, wherein depressurizing the mixture exfoliates the layers of graphitic material.

9. The method of claim 8, wherein at least a portion of the exfoliated layers of graphitic material includes single layer graphene.

10. A method of manufacturing a polymer master batch, the method comprising:
mixing a supercritical fluid and a composite material in an extruder to form a mixture, the composite material including a graphitic material and a polymer;
extruding the mixture down to ambient conditions to exfoliate the graphitic material; and
de-gassing the mixture.

11. The method of claim 10, wherein extruding the mixture down to ambient conditions depressurizes the mixture to allow the supercritical fluid to transition to a gas phase.

12. The method of claim 10, wherein extruding the mixture down to ambient conditions forms microstructures in the mixture.

13. The method of claim 12, wherein the microstructures are gas bubbles.

14. The method of claim 10, wherein the graphitic material has layers and the supercritical fluid intercalates between the layers of the graphitic material.

15. The method of claim 14, wherein extruding the second mixture down to ambient conditions exfoliates the layers of graphitic material.

16. The method of claim 15, wherein at least a portion of the exfoliated layers of graphitic material includes single layer graphene.

17. The method of claim 10, wherein the extruder is a twin screw extruder.

18. A method of manufacturing a polymer master batch, the method comprising:
mixing a supercritical fluid and a composite material to form a mixture, the composite material including a graphitic material and a polymer; and
de-gassing the mixture,
wherein the graphitic material has a first average thickness in the composite material and a second average thickness in the mixture, the second average thickness less than the first average thickness.

19. The method of claim 18, wherein the supercritical fluid is a first supercritical fluid and the mixture is a first mixture, the method further comprising:
mixing a second supercritical fluid with the first mixture to form a second mixture.

20. The method of claim 19, wherein the first supercritical fluid is different from the second supercritical fluid.

21. The method of claim 19, further comprising:
depressurizing the second mixture to allow the second supercritical fluid to transition to a gas phase.

22. The method of claim 18, further comprising:
maintaining the mixture above a critical pressure of the supercritical fluid.

23. The method of claim 18, further comprising:
maintaining the mixture above a critical temperature of the supercritical fluid.

24. The method of claim 18, wherein the graphitic material is at least one of crystalline graphite, graphene nanoplatelets, few-layer graphene, single layer graphene, graphene oxide, expanded graphite oxide, and combinations thereof.

* * * * *